(12) United States Patent
Zhao et al.

(10) Patent No.: US 8,898,623 B2
(45) Date of Patent: Nov. 25, 2014

(54) APPLICATION DESIGN AND DATA FLOW ANALYSIS

(75) Inventors: Keliang Zhao, La Jolla, CA (US); Yannis Papakonstantinou, La Jolla, CA (US); Kian Win Ong, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1126 days.

(21) Appl. No.: 12/650,539

(22) Filed: Dec. 30, 2009

(65) Prior Publication Data

US 2010/0205579 A1    Aug. 12, 2010

Related U.S. Application Data

(60) Provisional application No. 61/141,619, filed on Dec. 30, 2008, provisional application No. 61/221,011, filed on Jun. 26, 2009.

(51) Int. Cl.
*G06F 9/44* (2006.01)
*G06F 7/00* (2006.01)
*G06F 21/60* (2013.01)

(52) U.S. Cl.
CPC .................................. *G06F 21/604* (2013.01)
USPC .......................................... 717/105; 707/102

(58) Field of Classification Search
CPC .................................. G06F 8/20; H04L 67/02
See application file for complete search history.

(56) References Cited

U.S. PATENT DOCUMENTS

| 5,850,631 | A | 12/1998 | Golshani et al. |
|---|---|---|---|
| 6,014,656 | A | 1/2000 | Hallmark et al. |
| 6,061,515 | A | 5/2000 | Chang et al. |
| 6,115,690 | A | 9/2000 | Wong |
| 6,574,736 | B1 | 6/2003 | Andrews |
| 7,146,376 | B2 | 12/2006 | Dettinger et al. |
| 7,152,207 | B1 | 12/2006 | Underwood et al. |
| 7,275,216 | B2 | 9/2007 | Paoli et al. |
| 7,281,018 | B1 | 10/2007 | Begun et al. |
| 2002/0156904 | A1 | 10/2002 | Gullotta et al. |
| 2003/0035011 | A1 | 2/2003 | Lee et al. |
| 2003/0074606 | A1 | 4/2003 | Boker |
| 2004/0083204 | A1 | 4/2004 | Dettinger et al. |
| 2004/0103073 | A1 | 5/2004 | Blake et al. |
| 2004/0148270 | A1 | 7/2004 | McKay et al. |
| 2004/0181543 | A1 | 9/2004 | Wu et al. |
| 2004/0189716 | A1 | 9/2004 | Paoli et al. |
| 2005/0033719 | A1 | 2/2005 | Tirpak et al. |

(Continued)

OTHER PUBLICATIONS

Silver et al., WordPress 2.7 Complete, May 2009, Packt Publishing Ltd.*

(Continued)

*Primary Examiner* — Hyun Nam
(74) *Attorney, Agent, or Firm* — Perkins Coie LLP

(57) ABSTRACT

Techniques, apparatuses, and systems for application design and application data flow analysis. Techniques, apparatuses, and systems can include providing a design interface to create an application with different user groups and access rights, the design interface operable to specify an action to include to a page of the application, where the action, when invoked, modifies the application state; receiving an action specification that describes an access rights modification that results from an invocation of the action during an execution of the application, where the access rights modification indicates an enabling or disabling of one or more access rights of a user; and generating application specification queries and commands to enforce access rights based on the access rights modification.

13 Claims, 27 Drawing Sheets

(56) References Cited

U.S. PATENT DOCUMENTS

| | | | |
|---|---|---|---|
| 2005/0080766 | A1 | 4/2005 | Ghatare |
| 2005/0149549 | A1* | 7/2005 | Jaspers et al. ............... 707/102 |
| 2005/0188349 | A1 | 8/2005 | Bent et al. |
| 2006/0095373 | A1 | 5/2006 | Venkatasubramanian et al. |
| 2007/0083533 | A1 | 4/2007 | Mirkazemi et al. |
| 2007/0192863 | A1 | 8/2007 | Kapoor et al. |
| 2007/0226339 | A1 | 9/2007 | Suen et al. |
| 2008/0091606 | A1 | 4/2008 | Grecia |
| 2012/0011431 | A1 | 1/2012 | Mao |

OTHER PUBLICATIONS

Akutsu, T., et al., "Approximating Tree Edit Distance Through String Edit Distance," Proceedings of the 17th Annual International Symposium on Algorithms and Computation (ISAAC'06), vol. 4288, pp. 90-99, (2006).

Ali, M.A., et al., "MOVIE: An incremental maintenance system for materialized object views," Data & Knowledge Engineering, 47(2):131-166, Nov. 2003.

Ankolekar, A., et al. "The Two Cultures, Mashing up Web 2.0 and the Semantic Web", WWW 2007, May 8-12, 2007, Banff, Alberta, Canada.

Atzeni, P., G. Mecca, and P. Merialdo, "To weave the web," VLDB '97: Proceedings of the 23rd International Conference on Very Large Data Bases, pp. 206-215, San Francisco, CA, USA, 1997. Morgan Kaufmann Publishers Inc. ISBN 1-55860-470-7.

Bancilhon, F., et al., "A Query Language for the O2 Object-Oriented Database System," Proceedings of the Second International Workshop on Database Programming Languages, pp. 122-138, Jun. 1989.

Bille, P., "A Survey on Tree Edit Distance and Related Problems," Theoretical Computer Science, 337(1-3):217-239, Jun. 2005.

Ceri, S., P. Fraternali, and A. Bongio, "Web modeling language (WEBML): a modeling language for designing web sites," Computer Networks 33: 137-157 (2000).

Cobena, G., et al., "Detecting changes in XML documents," 18th International Conference on Data Engineering (ICDE'02), pp. 41-52, Feb. 2002.

Coghead, URL <http://www.coghead.com/> [accessed on Jul. 21, 2007], 40 pages.

Colby, L.S., et al., "Algorithms for Deferred View Maintenance," Proceedings of the 1996 ACM SIGMOD International Conference on Management of Data, pp. 469-480, Jun. 1996.

Cooper, E. et al., "Links: Web programming without tiers,". 2007. URL <http://groups.inf.ed.ac.uk/links/papers/links-fmco06.pdf>., 30 pages.

DabbleDB. URLs <http://www.dabbledb.com> [accessed on Jul. 21, 2007], 5 pages.

DeKlarit. URL <http://www.deklarit.com/> [accessed on Mar. 6, 2008], 3 pages.

Demaine, E.D., et al., "An optimal decomposition algorithm for tree edit distance," Lecture Notes in Computer Science—Proceedings of ICALP, vol. 4596, pp. 146-157, (2007).

Dimitrova, K., et al., "Order-Sensitive View Maintenance of Materialized XQuery Views," International Conference on Conceptual Modeling, vol. 2813, pp. 144-157, Oct. 2003.

Ennals, R.J. and M. N. Garofalakis, "Mashmaker: mashups for the masses," SIGMOD '07: Proceedings of the 2007 ACM SIGMOD international conference on Management of data, pp. 1116-1118, New York, NY,USA, 2007. ACM Press. ISBN 978-1-59593-686-8. doi: <http://doi.acm.org/10.1145/1247480.1247626> [accessed on Jul. 21, 2007].

eUnifyDB. URL <http://www.eunifydb.net> [accessed on Mar. 6, 2008]; 1 page.

FileMaker Pro 9 Tutorial. www.filemaker.com/downloads/pdf/fmp9_tutorial.pdf <http://www.filemaker.com/downloads/pdf/fmp9_tutorial.pdf> [accessed on Mar. 6, 2008]; 65 pages.

Form Assembly. URL <http://www.formassembly.com> [accessed on Mar. 6, 2008]; 1 page.

Foster, J.N., et al., "An Algebraic Approach to XQuery View Maintenance," ACM SIGPLAN Workshop on Programming Language Technologies for XML (PLAN-X), 11 pages, Jan. 2008.

Fourny, G., et al., "XQuery in the Browser," WWW, pp. 1011-1020, Apr. 2009.

Fraternali, P., "Tools and approaches for developing data-intensive web applications: a survey," ACM Comput. Surv., 31(3):227-263, 1999. ISSN 0360-0300. doi: <http://doi.acm.org/10.1145/331499.331502> [accessed on Jul. 21, 2007].

Fu, Y., et al., "Ajax-based Report Pages as Incrementally Rendered Views," SIGMOD'10, pp. 567-578, Jun. 2010.

Fu, Y., et al., "The SQL-based All-Declarative FORWARD Web Application Development Framework," 5th Biennial Conference on Innovative Data Systems Research (CIDR '11), pp. 69-78, Jan. 2011.

Garrett, J.J., "Ajax: A New Approach to Web Applications," http://www.adaptivepath.com/ideas/essays/archives/000385.php, 5 pages, Feb. 2005.

Griffin, T., et al., "Incremental Maintenance of Views with Duplicates," ACM SIGMOD Record, 24(2):328-339, May 1995.

Google Base. URL <http://base.google.com> [accessed on Jul. 21, 2007], 7 pages.

Gupta, A., et al., "Maintaining Views Incrementally," ACM SIGMOD Record, 22(2):157-166, Jun. 1993.

Gupta, A., et al., "Maintenance of Materialized Views: Problems, Techniques, and Applications," IEEE Data Engineering Bulletin, 18(2):3-18, Jun. 1995.

Habib, M.A., et al., "Analysis of Sources of Latency in Downloading Web Pages," WebNet, 19 pages, (2000).

"How to be successful with Salesforce", User Guide Copyright by Salesforce.com Available at <https://na2.salesforce.com/help/doc/en/sf.pdf> [accessed on Apr. 24, 2008] 1687 pages.

IBM QEDWiki. URL <http://services.alphaworks.ibm.com/qedwiki/> [accessed on Jul. 21, 2007], 3 pages.

Intuit Quickbase. "QuickBase—Work Better from one Web Based Software Application," URL <http://www.quickbase.com> [accessed on Mar. 6, 2008], 1 page.

Johnson, B., "Reveling in Constraints," ACM Queue, 7(6):30-37, Jul. 2009.

Krasner, G.E., et al., "A Cookbook for Using the Model-View Controller User Interface Paradigm in Smalltalk-80," Journal of Object-Oriented Programming, 1(3):26-49, Aug./Sep. 1988.

Kowalzcykowski, K., et al., "Do-It-Yourself Database-Driven Web Applications," 4th Biennial Conference on Innovative Data Systems Research (CIDR), Asilomar, California, USA, Jan. 4-7, 2009, 7 pages.

Microsoft InfoPath. URL <http://www.microsoft.com/office/infopath> [accessed on Jul. 21, 2007], 31 pages.

Microsoft Office Access 2007. URL <http://office.microsoft.com/en-us/access/FX100487571033.aspx> [accessed on Mar. 5, 2008], 1 page.

O'Hanlon, C., "A Conversation with Werner Vogels" ACM Queue, 4(4):14-22, Jun. 2006.

OpenRecord., "Elevator Pitch," URL <http://www.openrecord.org> [accessed on Mar. 6, 2008]; 3 pages.

Oracle Application Express Overview, an Oracle White Paper, Jan. 2006 <http://www.oracle.com/technology/products/database/application_express/pdf/apex_overview.pdf> [accessed Mar. 6, 2008], 16 pages.

Oracle Application Express URL <http://www.oracle.com/technology/products/database/application_express/index.html> includes overview, and tutorial [accessed on Jul. 21, 2007], 117 pages.

Polonsky et al., Official Microsoft Front Page 2000 Book, May 1999, 1st edition.

Ponzo, J. et al. "On demand Web-client technologies", IBM Systems Journal, vol. 43, No. 2, 2004.

Ross, K.A., et al., "Materialized View Maintenance and Integrity Constraint Checking: Trading Space for Time," ACM SIGMOD Record, 25(2):447-458, Jun. 1996.

WebRatio URL http://www.webratio.com [accessed Jul. 21, 2007], 7 pages.

(56) References Cited

OTHER PUBLICATIONS

Yang, F., et al., "A Unified Platform for Data Driven Web Applications with Automatic Client-Server Partitioning," Proceedings of the 16th International Conference on World Wide Web, pp. 341-350, May 2007.

Yang, F., et al., "Hilda: A High-Level Language for Data-Driven Web Applications," 22nd International Conference on Data Engineering (ICDE'06), 12 pages, Apr. 2006.

Yi, K., et al., "Efficient Maintenance of Materialized Top-k Views," Proceedings 19th International Conference on Data Engineering (ICDE'03), pp. 1-26, Mar. 2003.

* cited by examiner

WebDB 2010

Pages
Submit Paper

Submit Paper

Title: [    ]

Pdf: [    ] [Browse...]

Screenshot: [    ] [Browse...]

Authors: [    ]
add more Authors

[submit]

APPLICATION DESIGN AND DATA FLOW ANALYSIS

PRIORITY CLAIM AND CROSS REFERENCE TO RELATED APPLICATIONS

This document claims the benefit of the priority of U.S. Provisional Application Ser. No. 61/141,619, filed Dec. 30, 2008 and entitled "Computer-Implemented Design Interface For Designing Web Applications" and claims the benefit of the priority of U.S. Provisional Application Ser. No. 61/221,011, filed Jun. 26, 2009 and entitled "Computer-Implemented Design Interface for Designing Web Applications". The entire contents of all of the above identified documents are incorporated by reference as part of the disclosure of the this document.

FEDERALLY SPONSORED RESEARCH OR DEVELOPMENT

The invention was made with government support under Grant No. 0415257 awarded by the National Science Foundation ISS and under Grant No. 0721400 awarded by the National Science Foundation OCI. The government has certain rights in the invention.

BACKGROUND

This disclosure relates to application design and application data flow analysis.

Applications, such as web-based application, can facilitate transactions. For example, an owner of an online business may have an Internet site with a web-based application for browsing and purchasing goods and services. The web-based application can interface with a database for information retrieval regarding the goods and services and for accessing and storing customer data.

SUMMARY

This document describes technologies, among other things, for application design and application data flow analysis.

In one aspect, techniques can include providing a design interface to create an application with different user groups and access rights, the design interface operable to specify an action to include to a page of the application, where the action, when invoked, modifies the application state; receiving an action specification that describes an access rights modification that results from an invocation of the action during an execution of the application, where the access rights modification indicates an enabling or disabling of one or more access rights of a user; and generating application specification queries and commands to enforce access rights based on the access rights modification. Other implementations can include corresponding systems, apparatus, and computer programs, configured to perform the actions of the techniques, encoded on computer readable mediums.

These and other implementations can include one or more of the following features. Access rights modification can indicate a modification of a user's ability to access an associated page of the application. An access rights modification can indicate a modification of a user's ability to read an associated record or combination of records of the application. An access rights modification can indicate a modification a user's ability to perform an associated action on a record or combination of records of the application. An action specification can describe that the user associated with the access rights modification is at least one of: the user that invokes the action, one or more users appearing in the context of the action, one or more users appearing in the forms associated with the action, or one or more users identified based on a query parameterized by zero or more of the preceding users.

An action specification describes that a record associated with the access rights modification is at least one of: a record associated with the acting user, an acting context record, an acting form record, or one or more records identified based on a query parameterized by zero or more of the preceding records. An action specification includes an access right condition query that is either not parameterized, or parameterized by at least one of: the acting user, acting context record, and acting form record.

Generating application queries and commands to enforce one or more access rights can include determining whether the action specification is applicable to one or more actions of the application that are associated with iterator contexts having identical logical contexts, wherein the logical contexts comprise a grouping of equivalent iterator contexts. Providing the design interface to create the application can include providing an enumeration of a group of action patterns; and receiving an input that specifies at least one of the actions using an action pattern from the group of action patterns. Action pattern can provide default values for an action specification.

In another aspect, techniques can include providing a design interface to create an application with different user groups and access rights, where providing the design interface can include operating the design interface to include a first iterator to a first page of the application, where the first iterator can be configured to process one or more records; and discovering one or more tables of the application that are related to the first iterator. Discovering one or more tables can include accessing a second iterator of a second page and identifying that the first iterator is extendable with an extension iterator to process an associated table, where the extension iterator has an equivalent context to the second iterator and the second iterator has the same read rights with the first iterator. Other implementations can include corresponding systems, apparatus, and computer programs, configured to perform the actions of the techniques, encoded on computer readable mediums.

These and other implementations can include one or more of the following features. Implementations can include operating the design interface to receive an input to authorize a change to the application based on the discovered one or more tables. Implementations can include operating the design interface to update the application based on the discovered one or more tables. Operating the design interface to include the first iterator to the first page comprises receiving an input that signals an inclusion of the first iterator to the first page. Operating the design interface to include the first iterator to the first page can include receiving an output from a routine that signals an inclusion of the first iterator to the first page.

Implementations can include, responsive to introducing an iterator I with context C to a page P, which is accessible by an user group G, discovering an action A where the user group G has on another page P' action rights to perform the action A on records of context C; and either operating the design interface to receive designer input authorizing the extension of the iterator I with action A, or automatically performing the extension.

In another aspect, techniques can include providing a design interface to create pages of an application, the application including different user groups and access rights; and operating the design interface to simulate the application based on different ones of the user groups. Other implementations can include corresponding systems, apparatus, and computer programs, configured to perform the actions of the techniques, encoded on computer readable mediums.

These and other implementations can include one or more of the following features. Operating the design interface can include prompting, for example, a designer, to submit one or more records to effect a display of a page that includes an iterator that displays at least one of the records. Operating the design interface can include prompting for example, a designer, to interact with the application by using a sample user account to exercise at least one of the access rights. Examples of an access right include accessing a page, reading records of an iterator, or invoking an action. Providing the design interface can include communicating over a network to control a presentation of the design interface on a display of a computing device connected to the network.

In another aspect, techniques can include obtaining a data flow associated with an application that has multiple access rights, the data flow including an indication of a relationship between a first access right and a second access right of the multiple access rights, the relationship expressing an ability of a first user to invoke an action associated with the first access right that either enables or disables an association of a second user with the second access right; receiving input comprising an indication of a visualization option; and generating visualization data based on the data flow in accordance with the visualization option.

These and other implementations can include one or more of the following features. The visualization option can include a degree of summarization parameter. Implementations can include communicate the visualization data over a network. Implementations can include displaying the visualization data on a display of a computing device. Generating visualization data comprises producing a visualization with one or more visual descriptions of the conditions that are associated with the relationship between the first and second access rights.

Generating visualization data can include producing a visualization based on a default interpretation of a relationship between the first access right and the second access right. In some implementations, the user group associated with the first access right and the user group associated with the second access right being the same means the user performing the action associated with the first access right and the user performing the action associated with the second access right are the same. In some implementations, the iterator context associated with the first access right and the iterator context associated with the second access right being the same means the record associated with the performance of the action associated with the first access right and the record associated with the performance of the action associated with the second access right are the same.

In another aspect, techniques can include accessing an application specification that specifies an application, the application specification indicative of multiple access rights and multiple user groups, the multiple access rights including a first access right and a second access right; and determining, based on the application specification, relationships between the access rights to produce a data flow. Determining the relationships can include identifying a relationship between the first access right and the second access right based on whether a first user may invoke an action associated with the first access right that either enables or disables an association of a second user with the second access right. Other implementations can include corresponding systems, apparatus, and computer programs, configured to perform the actions of the techniques, encoded on computer readable mediums.

These and other implementations can include one or more of the following features. An application specification can include one or more of queries and commands expressed in a Structured Query Language (SQL). Determining the relationship between the first access right and the second access right comprises structural analysis of SQL queries and commands. Implementations can include rendering an application's data flow in a design interface; receiving an input from the design interface that signals a change to the application specification; and generating a different data flow based on the change to the application specification.

Systems and apparatus can include a mechanism such as a computing device configured to provide a design interface to create an application with different user groups and access rights, the design interface operable to specify an action to include to a page of the application, wherein the action, when invoked, modifies the application state; and a mechanism configured to receive an action specification that describes an access rights modification that results from an invocation of the action during an execution of the application, wherein the access rights modification indicates an enabling or disabling of one or more access rights of a user; and a mechanism configured to generate application specification queries and commands to enforce access rights based on the access rights modification.

The details of one or more implementations are set forth in the accompanying attachments, the drawings, and the description below. Other features will be apparent from the description and drawings, and from the claims.

BRIEF DESCRIPTION OF THE DRAWINGS

FIGS. 15(a), 15(b), 15(c) and 15(d) show screenshots of examples of action wizards.

FIGS. 18(a) and 18(b) show screenshots of examples of using data combination engine.

FIGS. 20(a), 20(b), and 20(c) show examples of different pages of an application.

DETAILED DESCRIPTION

Figure 1:
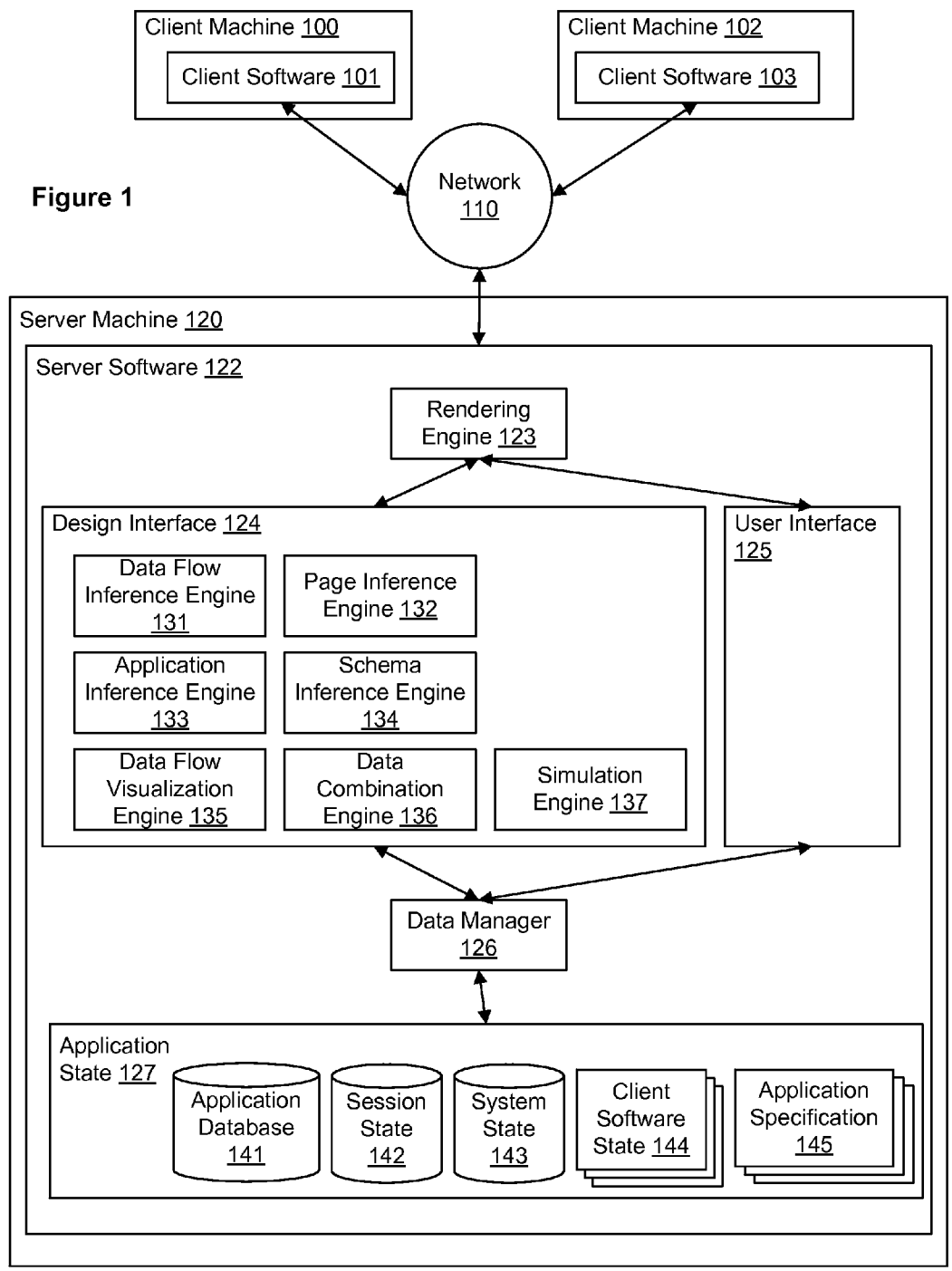
FIG. 1 shows an example of a system architecture associated with a design interface.

In today's world people interact and accomplish business processes by using database-driven, network-accessible applications. These applications are accessible via web browsers, palm and mobile devices and many other kinds of devices. These are hosted applications in the sense that significant part of the application's databases and of the code responsible for the implementation of the business process may reside at a host system that is distinct from the users' systems or even from the application designers' systems.

Business processes are often complex, in the sense that they involve multiple types of data, multiple users with different roles and rights in the process, multiple application pages, and multiple actions that each user can perform, often by using an interface provided by a page on her browser or other device. As the application becomes more complex the application designers and their managers may require a high level presentation and summarization of the user interactions in the process.

Applications such as web-based applications can be created by a visual, What-You-See-Is-What-You-Get (WYSIWYG) manipulation of the applications' pages and by answering configuration dialogs. Such creation of applications is referred to in the literature also as Do-It-Yourself (DIY) creation of applications. A WYSIWYG application design interface can include providing a tool to describe a high level specification of reports generated by complex queries, without having to specify low-level implementation details of queries such as projections, join conditions and selection conditions.

There may be properties of an application's page that are not immediately evident from the page's visual appearance. A difficulty faced by an owner of a collaborative application (as compared to an owner of a spreadsheet) in comprehending the behavior of an application and verifying it against her requirements, is that pages typically behave differently depending on what data has been submitted and who accesses the data.

This document includes, among other things, descriptions and examples of computer implemented systems to assist a designer in designing and maintaining database driven applications where users with different roles and rights interact via forms and reports that are implemented by web pages and/or other interfaces.

In one aspect, techniques and systems are described for the workflow inference, summarization and visualization of an application, e.g., a data flow. The summarization presents using a graph notation how the performance of an action on some data by the members of a user group affects the ability of members of one or more user groups to perform actions on data. An embodiment that visualizes the workflow also allows drilling down for more information into issues such as how the precise conditions by which a user's ability to perform an action affects other users' ability to perform the action.

In another aspect, techniques and systems are described for a workflow wizard that creates an application based on information collected from the application designer's about the data flow, e.g., about the rights of users to perform actions and how a user's performance of an action on some data affects other users' rights to perform actions on such data or other data.

In yet another aspect, techniques and systems are described towards assisting the designer of a collaborative application in comprehending the behavior of an application and verifying it against his/her requirements. The techniques and systems indicate how a design facility can prompt the designer to assume the role of particular sample users and engage in particular sample actions in order to comprehend the behavior of properties that would otherwise be hidden.

In still another aspect, techniques and systems are for operating a design facility for web applications can include providing a report building interface; and operating the report building interface to discover an optimal bundling of information on a report in order to illustrate associations and constraints between reported data sets. These and other implementations can include corresponding apparatus, and computer programs, configured to perform the actions of the techniques, encoded on computer readable mediums.

FIG. 1 shows an example of a system architecture associated with a design interface. A computing device such as a client machine 100, 102 can interact with a server machine 120 over a network 110 such as an Internet. A client machine 100 can run client software 101 to access server software 122 on the server machine 120 to develop a web-based application. Another client machine 102 can run client software 103 such as a web browser to access the web-based application via the network 110.

The following underlines terms can be used to describe one or more aspects of the subject matter described herein.

Designer: A designer can operate a computing device to use resources of a server machine to design applications. In some implementations, the client machine is separate from the server machine.

User: An end user operates a computer device to interact with an application residing on a server machine.

Client Machine: A client machine is a digital data processing machine which is employed by humans to access the server machine. Without any intended limitation, client machines comprise personal computers, computer workstations, personal digital assistants (PDAs), Internet enabled telephones, or any other computing devices appropriate to the operations described in detail below. According to one embodiment, no distinction is made between client machines used by users and client machines used by designers.

Server Machine: A server machine such as a digital data processing machine, e.g., server machine 120, that provides resources accessible by client machines 100, 102. The server machine 120 may be provided to various users via the network 110 and client machines 100, 102 or another such arrangement of link(s) and machine(s). Without any intended limitation, a server machine can be implemented by one or more personal computers, computer workstations, mainframe computers, or other digital data processing devices appropriate to the operations described in detail below. According to one embodiment, the server machine 120 is implemented by a computer workstation with resources sufficient to serve the anticipated number of client machines and processing load.

Link: The system in FIG. 1 includes a server machine 120 that is coupled to various client machines such as 100, 102 by a network 110, which may be implemented with numerous different hardware and communications protocols, with some examples including Internet, Intranet, satellite, LAN, WAN, fiber optic network, Ethernet, wireless telephony, landline telephony, etc. The server machine may also be the same physical machine as the client machine, in which case the link comprises main memory, Unix domain sockets, or any other communications link that does not cross machine boundaries.

Client Software: Client software 100, 102 can be a software operating on the client machine that allows a designer and/or a user to access an application. Without any intended limitation, client software comprise web browsers, X Window clients, or other software appropriate to communicating with the server software.

Server Software: Server software is software operating on the server machine. In the example shown, the server software includes various subcomponents 121-145, and their respective subcomponents.

Application: An application refers to interactive software that can be accessed by one or more users. Without any intended limitation, the present disclosure focuses on web applications.

Page Instance: A page instance refers to a screen produced by an application that is suitable for displaying data and accepting user interaction. To construct page instances, the application performs computation such as retrieving data and rendering the data for display. In addition the application may accept user-provided input from the page instances and utilize them for computation. An example is the Yahoo™ Finance database-driven web application that, among other pages instances, produces web page instances that provide stock market quotes and other financial information upon being provided a stock market ticker symbol by the user (via a web browser).

Page: A page refers to a specification, including of data and executable code, within an application that produces a set of page instances in accordance with the specification.

Record: A record is any data object that has attributes. For example, a "person" record has attributes such as "first name", "last name", "SSN" etc. It is possible that a record contains nested records. Records are often implemented as tuples of a relational database table, or XML elements of XML databases, or Java objects carrying attributes/properties.

Iterators and Nested Iterators: This refers broadly to constructs of pages that function as follows. During the generation of page instances by an application, the iterator processes records that are the result of retrieving data, and potentially filtering, combining and transforming them. The page instances contain instances of the iterator where, for each processed record, the iterator instance contains one instance of a repeating structure that shows zero or more records. Iterators may be, without limitation, associated with tables displayed on page instances. An iterator may contain other iterators, in which case such iterators are called nested iterators. Iterators can be implemented using a vast array of technologies. Iterators may also be referred to as iterator units.

Iterator Instances: This refers broadly to constructs of pages that function as follows. During the generation of page instances by an application, the iterator processes records that are the result of retrieved data, and potentially filtering, combining and transforming them. The page instances contain instances of the iterator where, for each processed record, the iterator instance contains one instance of a repeating structure that shows zero or more records. The repeating structure may itself contain instances of nested iterators. Iterator instances are often displayed as tables or lists. In such case, the repeating structure is the table rows, which may contain nested tables.

Application State: Application state refers to data that that an application retrieves and/or modifies. Application state can comprise both transient and persistent data. Without any limitation, this disclosure contemplates application state that is accessible via data structures in main memory, databases, web services, or any other mechanisms that allow retrieving and modifying data.

Examples of application state include, session state, such as the current user; System state, such as the current time; and Client software state, such as the cursor position and the scroll position of a web browser. Where the server machine and client machine are different physical machines, client software state can be transmitted across the link from the client machine to the server machine. examples of application state can include Persistent state, such as records persisted in a database.

User Identity: A user identity is a unique identifier for a user that uses the application, and without limitation a user may be an individual, a company, an organization et cetera. A user identity may or may not be verified via authentication mechanisms; in particular an unauthenticated user may be an anonymous user. Examples of user identities include, but are not limited to, email addresses, OpenID tokens, and social security numbers. For ease of explanation, the disclosure assumes without any intended limitation that the user is synonymous with the user identity that represents it.

Session: A session is a period of activity when a user interacts with an application. The user may or may not be anonymous. Without any limitation, examples of sessions include HTTP sessions for web applications and login sessions for operating systems.

Current User: The current user of a session is the user identity associated with a session. The user may or may not be anonymous.

Database & Schema: A database refers to a persistent data structure, such as 141. In general, the data structure contains collections of records of various types that conform to a schema. Without any limitation, this disclosure contemplates schemas such as a relational schema, XML schema, or any other specification that captures aspects of data such as the types of records of the database, records' attributes, records' relationships and constraints that the records may have to satisfy (such as uniqueness constraints or referential integrity constraints), and the like.

Query: A query is a procedure that retrieves records from the application state, and returns the records to the caller. (It is possible however to specify the procedure to return constant records or no records without accessing the application state.) A query may declare parameters, and when executed will receive input arguments conformant to the parameters. Without any limitation, this disclosure contemplates queries that are specified declaratively in database query languages, such as SQL and XQuery, as well as queries specified imperatively in programming languages such as C and Java.

Condition Query: A condition query is a procedure that executes a query and returns true if one or more records are retrieved, and false otherwise.

Command: A command is a procedure that modifies (and retrieves) records in the application state. (It is possible however to specify the procedure to not access the application state.) A command may declare parameters, and when executed will receive input arguments conformant to the parameters. Without any limitations, this disclosure contemplates commands that are specified declaratively in database query languages, such as SQL DML statements and the XQuery Update Facility, as well as commands specified imperatively in programming languages such as C and Java.

Application Specification: An application specification specifies an application, including aspects such as pages user groups, application database schema and other aspects appropriate to the operations described in detail below. A page can have one or more of forms, reports and actions. In some implementations, the system in FIG. 1 can operate as an interpreter of the application specification, whereas in every step it inputs the application specification and the data and produces a page instance.

In a different embodiment, the functions of the system can include compiling code. In this embodiment, an application specification is compiled into corresponding code. Such compiled code need only receive data needed for pages; it does not need to receive the application specification since the code already reflects the application specification information. The performance and flexibility trade-offs of the two embodiments are typical of the trade-offs between interpreted and compiled versions of software. Without any intended limitation, examples in the present disclosure utilize the interpreted version for ease of explanation.

Application Database: As part of the application state, an application has an application database 141 that is structured according to an application schema. The application schema captures aspects such as the various types of objects of the application, the attributes of the objects, the relationships between various types of objects and what constraints may apply on the application database.

In some implementations, an application specification is defined by a general framework. In the following, we focus on the part of the framework that pertains to database-driven applications. An application specification is modified by the owner when the application is in design mode. The specification includes of primitive properties (collectively called primitive specification) and derived properties, where the former are more low level (e.g., queries, constraints) and their settings cannot be derived by the settings of other properties. For ease of specification the non-programmer designer typically does not access the primitive specification aspects directly, since deconstructing a process into primitive aspects tends to require CS sophistication. Rather the non-programmer designer indirectly accesses them via the derived properties, which explain at a high level common questions and options, using wizards and other components of the DIY design interface.

The primitive specification includes of page specifications, user group definitions, a database schema and general properties, such as the application name and path.

Each page specification can include a URL, a page context, which captures the request parameters (and the types of their values) that are expected upon requesting this page, and a top-level unit.

Iterator: An iterator processes records and displays them as part of a structure that shows zero or more records. To retrieve the records, an iterator has a query, which is typically parameterized by the iterator contexts that the iterator is nested within, and application state such as current user and current time. The query retrieves from the application state tuple $t_1 \ldots t_n$, that have schema t and correspond to the records displayed by the iterator. Iterators are used for both forms and reports on pages. An iterator contains zero or more fields, such that each record displays an attribute for each corresponding field. An iterator also contains zero or more nested iterators. Collectively, iterators and fields are also known as "units", where iterators are referred to as iterator units, and fields are referred to as atomic units. Atomic units generally display data of corresponding parameters of the context.

In some implementations, a query of an iterator (and consequently the iterator itself) produces at most one record. Such iterators are called singleton iterators. The teachings of this disclosure also apply to singleton iterators, despite the fact that the structures they produce do not produce a repeating structure.

Iterator Context: The iterator context comprises the types of records displayed by the iterator, and the iterator contexts that the iterator is nested within.

Logical Context: A logical context is a grouping of iterator contexts within an application that are equivalent to each other. Two iterator contexts are equivalent if their respective queries are equivalent, and (recursively) their respective parent iterator contexts are equivalent.

In one embodiment, the iterator contains the displayed fields of the retrieved tuples. Such unit operates within context c+t, which is the concatenation of c (e.g., the context within which the iterator operates) and t (e.g., the context that the iterator generates). An iterator unit may recursively contain its own nested iterators.

A general framework allows iterator queries to be arbitrary SQL queries over the schema, typically parameterized by values of the context. In this way SQL experts can utilize SQL's full power. Furthermore, the analysis of SQL queries provides how an iterator extends its context. For example, consider a query of the form SELECT * FROM OuterJoinExpression WHERE BooleanCondition, where the condition may be parameterized with values from the context generated by the enclosing iterators and may also involve EXISTS (SubQuery) predicates. It is easy to see that the context is extended with the list of tables in the OuterJoinExpression.

Calculated units can be associated with queries and capture the typical functionality of Excel spreadsheets. In some implementations, a calculated unit can compute a new "scalar" value from values of the context. For example, if the context has attributes First Name and Last Name then the calculated unit Name may be calculated as concat (Last Name, ",", First Name). In some implementations, a calculated unit can compute an aggregate value by applying an aggregate function over a nested iterator of the page. For example, the non-programmer owner may include in All Papers a calculated unit Number of Authors that performs the count function over the Authors iterator fields. In some implementations, a calculated unit can be formed based on a combination of techniques.

The top-level unit of the All Papers page (FIG. 20b) has an iterator unit, which contains the atomic units Title and Screenshot. This iterator runs a query SELECT * FROM Submit_Paper, where Submit_Paper is the automatically inferred table that collects the non-nested fields of the paper submission form (see FIG. 20a). It also contains the (nested) iterator unit Assign, which, in turn, contains the atomic units Reviewer (no label for it appears). The query of the iterator Assign is SELECT * FROM Assignments WHERE Assignments.Parent=? and the parameter (?) is instantiated by the Submit_Paper.ID of the query result of the containing iterator.

Figure 20B:
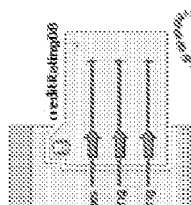

By clicking on the "details" link of FIG. 20(b) the user navigates to a page presenting the details of the paper. A sample of such page is in FIG. 18(b). The top-level unit of this page is a singleton iterator that runs a parameterized query "SELECT FROM Submit_Paper WHERE ID=?". It is singleton in the sense that it will always produce at most one record.

Action: An action specifies how users can interact with the application. An action provides an interface in the application that provides interaction, examples of which include hyperlinks, buttons and keystrokes. Examples of actions in an application include Submitting a record, Editing a record, Removing a record, Providing authentication credentials to log into an application, Sending an email, Adding an item to a shopping cart, Providing a credit card for payment Action Context: In the general case an action appears within an iterator. Then the action context is the iterator context that the action belongs to. The action context provides data that the action needs in order to be instantiated and executed. For uniformity, if an action does not appear within an iterator we will assume that it has an empty context.

Action Form: The action form is a form that an action can be optionally associated with such that if the action form is specified, the user provides records in the form when invoking the action. Each field of the form may be mandatory or optional.

Program: A program is activated whenever an action is invoked. A program is a procedure comprising commands and queries. Without any limitation, this disclosure contemplates programs that are specified as a linear sequence of commands and/or queries, as well as programs with control flow structure such as branching and loops as specified in an imperative programming language. When activated, a program receives the following as input, and may in turn provide them as input arguments to the commands and queries, e.g: the action, the records of the action context, named Action Context Records in the rest, the records of the action form, named Action Form Records in the rest, the application state.

A program can include an access right query that determines whether a user is authorized to activate the program, one or more update commands that modify the application state, a rendering command that retrieves data from the application state, and modifies the client software state in order to produce/refresh the interface through which the user interacts.

Logical Action: A logical action is a grouping of actions within an application that are equivalent to each other. Two actions are equivalent if they are either associated with the same program, or if the respective programs they are associated with are identical procedures.

In some implementations, a unit can contain zero or more actions, where an action combines an HTML input form with information on the effects of submitting the form. In particular, an action contains (i) zero or more input units that write underlying database fields (ii) a button (iii) a constraint, represented by a yes/no query whose semantics is that the action is applicable only when the constraint is satisfied, and (iv) a program producing a list of effects.

The most common effect of executing an action is an update on the database; this will be the only effect discussed in detail next. In a general framework such effect is captured by an SQL statement, which is possibly parameterized by the context. It is also common that such SQL statements are encapsulated into calls of a programming language. In some implementations, the database effect of an action can be automatically inferred by the DIY design interface. For example, it may be an insertion in the database of the values collected by the input fields. Whether it is automatically inferred or it is explicitly provided by the designer, it will be described in the application specification by (i) naming the database table that takes the insertion and (ii) mapping the input fields to type-compatible attributes of the table. If the form contains repeated nested forms, such as the Authors in the Submit Paper form, then each nested form is mapped to a corresponding database table. Note that the inserted record also includes system attributes such as the auto-generated ID, the submitter and creation timestamp of the record.

Other effects of an action can include (i) sending an email, described by a template (in the style of MS Word mail merge) whose placeholders can refer to both the input fields of the form and the system attributes and (ii) causing a navigation to another page, which can be used to produce confirmation pages and forms submission processes that span multiple pages.

For example, the data submission form of FIG. 20a is an action. Its effect is inserting the collected data in tables Submit_Paper and Authors and sending a confirmation email. It has the constraint that the currently logged-in user has not submitted a paper already. The assign, remove and submit of FIG. 20b are the buttons of respective actions.

Note that a feature that sets the scope of applications apart from the scope of online databases is the ability of reports to have nested actions, which operate in the context of iterators. For example, the assign action in FIG. 20b operates within the context created by the containing iterator. Such a nested action is said to be an annotation of its iterator. A nested action differs from a top level action as follows: First, when it inserts in the database it may map values from its context into attributes of the underlying table. In the particular example, it makes sense to simply insert a tuple into an underlying Assignment table for insertions. When the assign action is executed it stores a tuple in a table Assignment and this tuple has a foreign key attribute that stores the ID of the paper submission within whose context the particular nested action operates. Second, its constraint and its side effects may also utilize the context. For example, the submit action on the Submit Paper page is associated with a constraint that there may be at most one paper submission per user.

There may be iterator and action combinations where the iterator part of the combination ranges over data created in response to the action part of the combination. For example, the iterator/action combination Review in FIG. 20c combines the submit action with the Review iterator that shows the reviews created by the submit action.

User Group: A user group is a named set of users that is utilized for restricting part (or all) of an application to authorized users. A user group is specified as a query over the application state, and each user may belong to zero, one or more user groups.

In some implementations, user groups (such as Authors, Chairs and Reviewers) are identified as a pair including of a report page and a field (of such report) whose values are user identities. The submitter is typically such a field. In some implementations, a user group can be identified by a database query, where one field in the result of such database query has user identity values.

Access Rights: The users of an application generally have different access rights at different times during the run of the application. There are three main types of access rights that this disclosure discusses: page rights, read rights and action rights.

Page Rights: Page rights describe whether a user U can access a page P at a given time during the operation of the application. In one embodiment, page access rights are implemented by having each page P optionally have a condition query that determines whether the current user U can access the page. Without limitation, the condition query may access the current user information, user groups, or any other application state and may be implemented in a programming language or a database query language or a combination thereof.

Read Rights: Read rights describe which records produced by an iterator can be read by a user U at a given time. In one embodiment, read rights are implemented by a combination of the iterator's query, along with the page's condition query and optionally a condition query that may put additional requirements for presenting a record produced by the iterator to the user. In another embodiment, the iterator's query itself may use the current user identity as a parameter and produce different records depending on the identity of the current user. Without limitation, any of these queries may access the current user, user groups, the iterator context, or any other application state.

Action Rights: Action rights describe whether a user U can execute an action A on a context C at a given time, where the action could be, without limitation, editing a record, deleting a record, making a purchase (where most likely the context record provides the product to be purchased), etc. In one embodiment, action rights are implemented by having a condition query associated with the action such that (together with page rights and read rights on the context records) the condition query determines whether a user can invoke an action on a record produced by the iterator that provides the context. Without limitation, the condition query may access the current user, user groups, the iterator context, or any other application state.

In an application where users with different roles and rights interact, the designer often needs a presentation of the access rights associated with the users of the application. Furthermore, the designer needs to understand how the performance of an action associated with an access right by users of a given user group may enable or disable an access right of users of the same or another user group.

In the embodiment presented next, a novel construct, named data flow, is introduced and computed in order to solve the problem of the above paragraph. The data flow provides a presentation of the access rights of various user groups of the application and explains the relationship between access rights of different user groups, in the sense that it presents how the performance of an action by users of a group affects the ability of users of another group to perform such action.

Note that a data flow typically is not a function of the current state of the application at the particular time that the designer inspects it. Rather, it represents access rights that users may have over the lifetime of the application.

The following constructs facilitate the computation of data flows in the presented embodiment and are consequently used in the method. They also enable the definition of important properties of data flows.

An Access Right Fact (also called a Fact): A statement that a specific user has a specific access right, which may be a read right or an action right, to a specific record. We also consider the right of a user to access a certain page to be an access right fact. Notice that page rights do not pertain to a particular record. In one embodiment, such statements can be represented by facts of the form (a) page(P,U), that indicates that the user U can access page P (b) read(R, U) that indicates that the user U can read the record R produced by an iterator and (c) action(A, R, U) that indicates that the user U can perform the action A in the context R produced by the enclosing iterator.

Application State Facts: Each application state is associated with a set of facts, which describe what users can do in such state. We will call this set, the set of application state facts. We will refer to it simply as application state when there is no ambiguity on whether we refer to the set of application state facts or the actual application state (state of the databases, main memory, etc). Notice that the set of application state facts may or may not be explicitly materialized in an embodiment. The execution of an action by a user on some context can be referred to as an "execution of a fact", where such fact is the one that refers to such action, user and context.

A data flow now can be considered as a presentation of an application specification that summarizes the access rights facts and the enablement/disablement of some facts caused by the execution of other facts. In some implementations, the enablement/disablement relationship between access rights is visualized as a graph including of nodes, edges and additional labels as described next.

A node of a data flow: In a data flow, a node is a description of a set of facts, possibly using variables. Given an application state S, it can be decided whether a fact of the application state is included in the set described by a node (or "included in the node given S" for short) if the instantiation of the variables of the node with a particular user and context record produces the fact.

A node of a data flow may also be associated with conditions that utilize the variables. For example, a node may by action(U, buy, R) and the condition may state that U has to be a user of the group "customers in good standing" and R must be a record that belongs to "available products". Then in order for a fact to be included in the node the variable instantiation will also need to satisfy the condition.

An edge of a data flow: An enabling edge from node A to node B is intended to indicate that there is some application state S, such that an execution of a fact included in node A given S enables a fact FB which is currently disabled. In particular, the fact FB is not included in node B given S but is included in B given the new application state produced by the execution of the fact.

Symmetrically, for the case of disablement, a disabling edge from node A to node B is intended to indicate that there is some application state S, such that an execution of a fact included in node A given S disables a fact FB which is currently enabled and included in node B, i.e., FB is included in node B given state S but is not included in node B under the new application state produced by the execution of the fact.

An edge may also have conditions that further constraint, given an application state and two facts, whether the execution of the first fact will enable/disable the second fact.

Default facts of data flow: A data flow may specify that some facts are enabled by default. An entire node is marked as enabled by default if with the initial application state every fact included in this node is enabled by default. A data flow without any default facts specified assumes that every fact is enabled by default.

Runs described by a data flow: A way to formalize the meaning of a data flow is via the concept of application runs. The intuition is that a perfect description of the behavior of a collaborative application would be the set of all its possible runs, where each run is a possibly infinite sequence that includes of the series of actions performed by the application's users. The transition from an application state to the next application state is caused by the execution of an action by a user. Note that the action may be associated with particular context records and may also create form records (data the user provided in forms, during the action). The sequence also provides the application state facts before (and therefore after) each action. While a set of infinite sequences is obviously a non-viable description of an application, data flows summarize the set of possible runs of an application, as follows.

A run R is described by a data flow if for each consequent snapshots S and S' in the run where the transition is T, the enabling fact is F (i.e., T is the F without the form data) and the new facts of S' are $F_1, \ldots, F_n$ then for each fact $F_i$ there is a node Src($Vars_{Src}$) (i.e., a node Src with a list of variables $Vars_{Src}$) a node Dest($Vars_{Dest}$) and an edge between Src and Dest in the data flow such that: there is an instantiation of the $Vars_{Src}$ such that Src($Vars_{Src}$) becomes F and F is a fact of S; for each i=1 . . . n an instantiation of the $Vars_{Dest}$ such that Dest($Vars_{Dest}$) becomes $F_i$ and $F_i$ is a fact of S'; assuming an edge in the data flow is also associated with a condition C between $Vars_{Src}$ and $Vars_{Dest}$, the instantiations above satisfy C. Similar for conditions associated with nodes; F is enabled by default or was the new fact of a snapshot before S'. Disablements can be defined similarly.

Completeness of data flow: A data flow is complete with respect to an application specification if every possible run of the application is described by the data flow.

Tightness of data flow: A data flow is tight with respect to an application specification if every run described by the data flow is a possible run of the application. A data flow is tighter than another data flow if every impossible run described by the former is described by the latter, while there is an impossible run that is described by the latter but not by the former.

A data flow can be visualized in one or more ways. In some implementations, a data flow visualization can include are nodes and edges as described above. In some implementations, the data flow visualization of an application (see, e.g., FIG. 21) has nodes that correspond to pages and has edges that capture actions that happen on the page at the source node of the edge and affect the rights of a user as described by the target node of the edge. The starting points nodes of such a data flow are data collection pages that have actions that are enabled by default, such as the paper submission in the running example. There is an edge from page $P_1$ to page $P_2$ labeled with request $a_1$ if executing $a_1$ on $P_1$ may change: the read rights of a user u on $P_2$, that is, u can read on $P_2$ a record r as a result of $a_1$ (e.g., the submit edge from page Submit Paper, accessible to authors, to page All Papers, accessible to chairs, denotes that chairs gain read rights to a paper once the paper is submitted); the action rights of a user u on $P_2$, that is, u can perform a request $a_2$ on $P_2$ as a result of $a_1$ (e.g., the assign edge indicates that upon executing the assign action on All Papers a user (in this case the corresponding reviewer) can read and comment on a paper submission at the Review Assigned Papers page); and the access rights of a user u on $P_2$, that is, u gains access on page $P_2$. For example, the assign edge of also indicates that a reviewer gains access to the Review Assigned Papers page.

A design system can enable people to design and host applications. This system may be embodied by various hardware and/or software components and interconnections. For ease of description, the system is usable to design applications and also host the resulting applications. However, different systems may be used for these purposes: one for design and another for hosting. Indeed many combinations are possible depending on where various components of the application state are hosted. One option is to design the entire application state in one system, and then host it in another system. Another option is to host only the application database in another system. In the general case, multiple applications may be designed and hosted on a system. This disclosure contemplates further arrangements, as will be apparent to those of ordinary skill having the benefit of this disclosure.

In the system, there are various data processing components, such as the client machines 100-100a, the client software 101-101a, the communications link 110, the server machine 120, and the subcomponents 122-145 of the server machine 120. These may be implemented by one or more hardware devices, software devices, a portion of one or more hardware or software devices, or a combination of the foregoing.

Server Software: The server software 122 manages all communications between the server machine 120 and the client machines 100, 1002. This includes addressing messages, observing the proper communications protocol, and the like. In one embodiment, the server software is a web application server that facilitates communications through HTTP with client software that are web browsers. The web application server also directs incoming messages from web browsers to either a design interface 124 or a user interface 125 as appropriate.

Rendering Engine: The rendering engine 123 produces the input and output format that is compatible to the client software and server software combination. In one embodiment, a web page instance is rendered into HTML/Javascript that is compatible with the web browser of the client machine. In response to user request, the rendering engine for HTML/Javascript also accepts incoming parameters in the form of GET/POST calls.

Data Manager: The data manager 126 manages retrieving data from and modifying data in the application state 127. Application state 127 can be associated with an application database 141, session state 142, system state 143, client software state 144, and an application specification 145. In particular, when a designer is designing an application, the data manager 126 can assist the creation and modification of the application schemas in the application database 141 as directed by the schema inference engine 132, and can assist the creation and modification of application specifications as directed by various inference engines. Examples of inference engine include the page inference engine 132, the application inference engine 133, the schema inference engine 134, the data combination engine 136 etc.

User Interface: The user interface 125 enables users' access to the applications hosted by the server 120. In response to user request, the user interface 125 may utilize the data manager 126 to retrieve and/or modify data of the application state.

Design Interface: In contrast to the user interface 125, the design interface 124 enables designers operating client software 101, 103 to design applications. In some embodiments, the design interface may provide many or all of the functionality provided by the user interface while in other embodiments the design interface may provide design functionality exclusively. Broadly speaking, the design interface relays user commands that affect the application specification 145 to the corresponding modules.

The design interface can include one or more sub-modules that perform various tasks. Various examples of sub-modules include a data flow inference engine 131 that infers a data flow from an application specification, a page inference engine 132 that infers pages and relates pages to the data structures in the application database, an application inference engine 133 that infers queries and commands in the application to enforce access rights conformant to the specification of actions, a schema inference engine 134 that infers data structures in the application database, a data flow visualization engine 135 that visualizes a data flow at different degrees of summarization, a data combination engine 136 that allows the designer to specify how data of other pages are potentially combined and reported in pages, and a simulation engine 137 that prompts the designer to simulate the application from the perspective of sample users.

Figure 2:
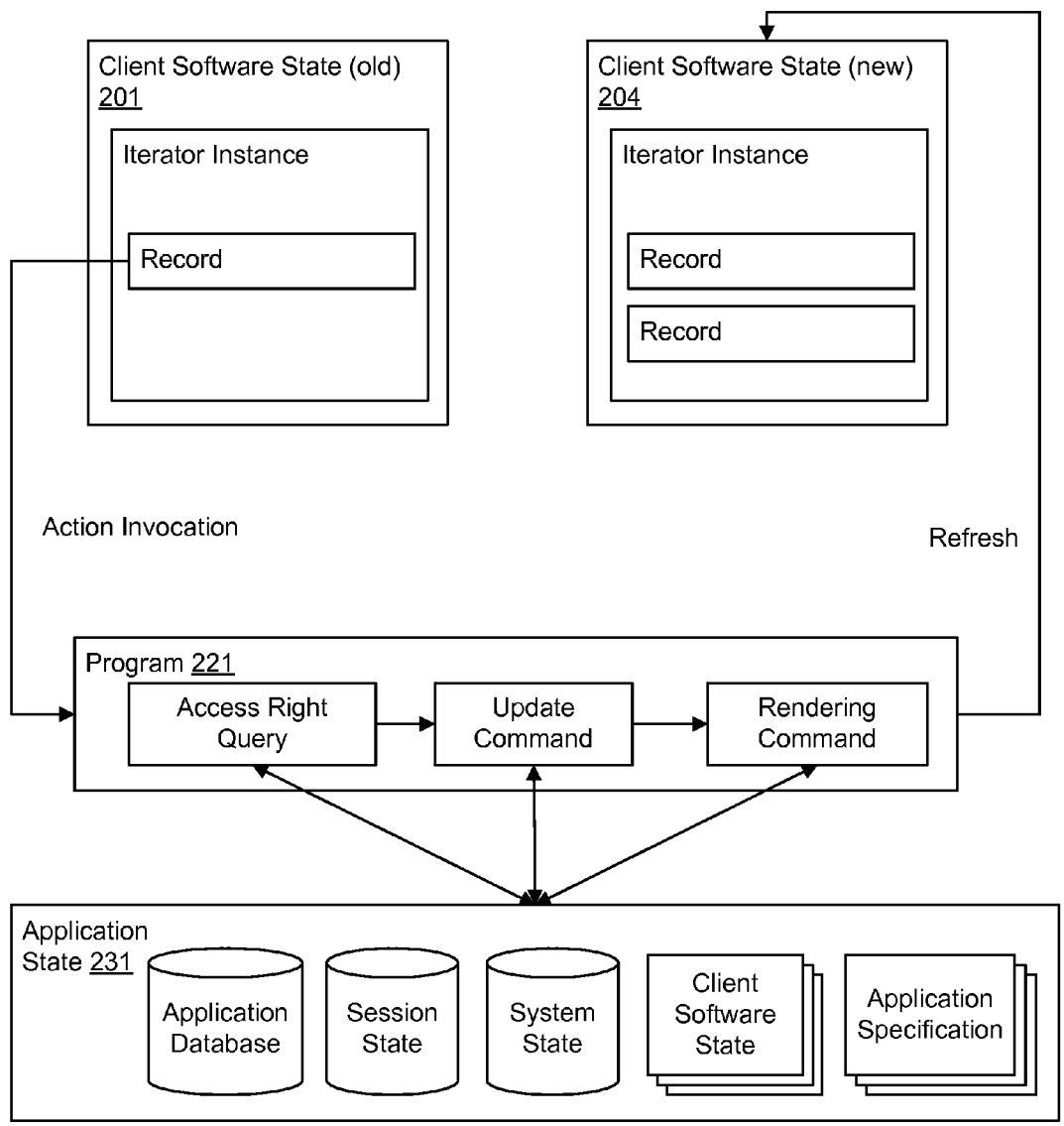
FIG. 2 shows an example of a run-time framework that changes client software state.

FIG. 2 shows an example of a run-time framework that changes client software state. A Client software state 201 can be refreshed to move to a different client software state 204 based on a program 221 associated with an application state 231.

Systems and techniques are described herein that simulate different user roles of an application.

The inherent difficulty faced by a designer of a collaborative application (as compared to a designer of a spreadsheet) in comprehending the behavior of an application and verifying it against her requirements, is that pages typically behave differently depending on what data has been submitted and who accesses the data. In one embodiment, the design interface takes a number of steps towards resolving this problem. First, it makes every feature that is available in use mode also available during design mode. Then the page specifications are interpreted, instead of requiring a design-compile cycle, facilitates this. Second, it always prompts the designer to submit sample data and make requests so that corresponding records can be shown on report pages. The third step is to prompt and help the designer assume the role of particular sample users in order to visualize the behavior of properties that would otherwise be hidden.

Given a page of an application, a design interface can prompt a designer to simulate the application by using sample users to exercise access rights, in order to illustrate how access rights differ based on the current user.

Figure 16:
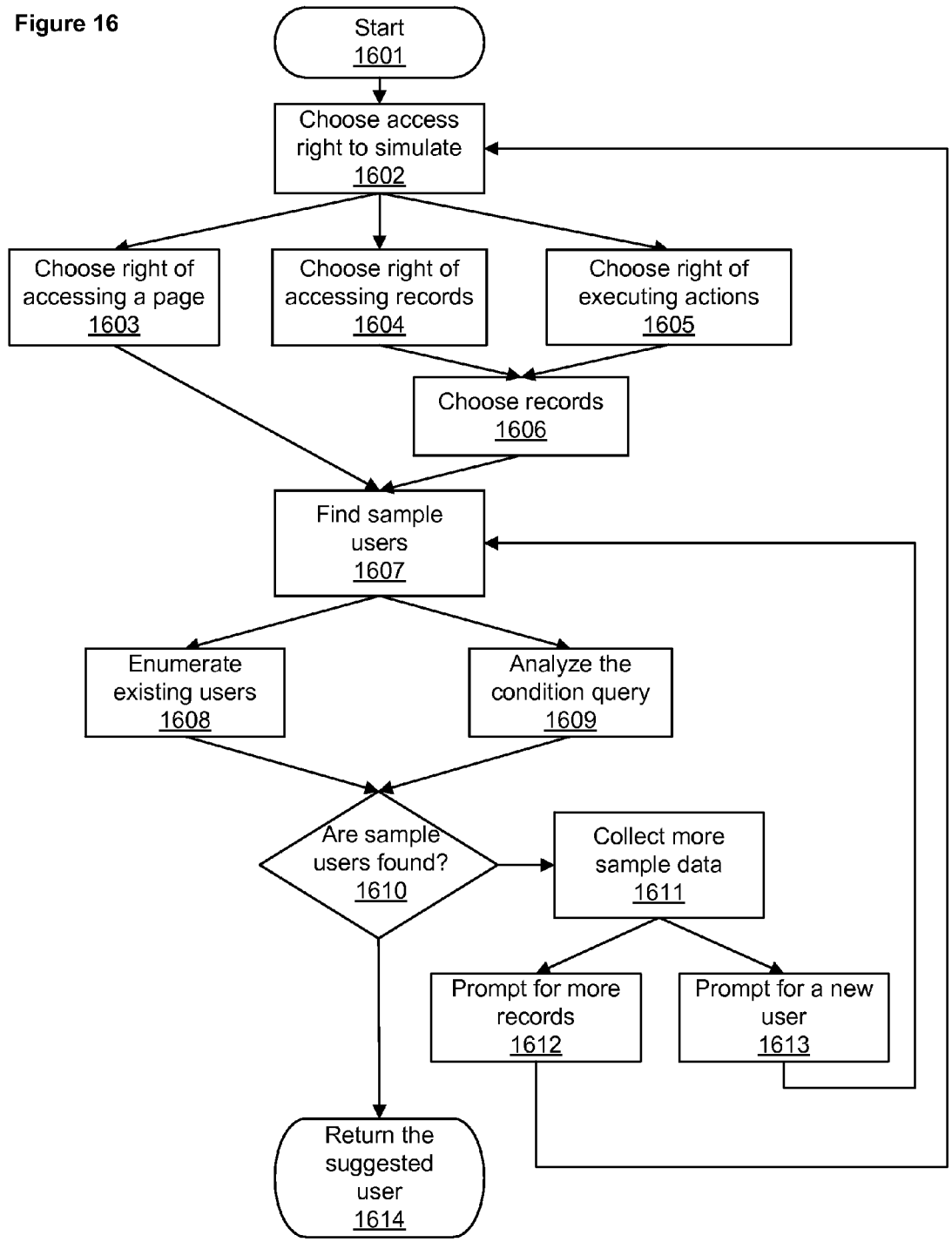
FIG. 16 is an example of a flow diagram of a process of simulating an application.

FIG. 16 shows an example of a flow diagram of a process of simulating an application. In Step 1602, one access right is chosen to exercise. The access right can be one of accessing the page (Step 1603), accessing records of an iterator in the page (Step 1604), or invoking an action (Step 1605). If accessing records or invoking an action is chosen, the contextual records are chosen next in Step 1606.

In Step 1607, two sample users are searched for, one has the chosen access right and the other does not. An implementation can take either Step 1608 or Step 1609 to find each sample user.

In Step 1608, each existing user is enumerated and tested to see if the user is able to exercise the chosen access right by running the condition query with the user. The searching finishes when one user who has the access right and another user who does not are found.

In Step 1609, the condition query of the access right is analyzed in order to decide the users who have the access right directly. Without limitation, in one embodiment where the condition query is implemented as a SQL query, the condition query can be handled as follows. The condition query will contain a WHERE clause with a boolean condition comparing the current user to a user attribute in the database. By removing the boolean condition (and adding the user attribute to the SELECT clause), the query can be modified from returning a yes/no result into a set result that contains the users who can exercise the access right. From this set, the system can then choose one user who can exercise the access right and one user who cannot.

In Step 1610, the result of the search of the sample users are checked and, if there is no user who can exercise the chosen right or no user who cannot exercise the chosen right, Step 1611 is taken.

In Step 1611, the present invention suggests the user to provide more data in order to make finding two sample users possible. It can take Step 1612 or Step 1613 to prompt for data.

In Step 1612, more records or execution of actions are prompted with the guidance of the application's data flow. In general, any node that has an out-going edge to the node of the chosen access right in the data flow may suggest an execution of an access right fact that can enable/disable the chosen access right. Then the procedure repeats from Step 1602.

In Step 1613, the addition of a new user to the application is prompted, guided by the application's data flow. Then the procedure repeats from Step 1607.

The simulation engine can also prompt for sample at various stages of the overall simulation, especially when the designer is at the page where the additional data is collected. This improves the overall simulation experience since it reduces the number of times that the designer is prompted to navigate to another page to provide additional data for simulation.

A design interface can use various visual elements and techniques to prompt the designer to conduct the simulation, e.g., a dynamic to-do list that shows what use and design actions are suggested with the to-do list updated and refreshed after each user action, a "use-as" dialog that prompts the designer to use the application as a sample user where the sample user may be selected from a suggested list, and labels and arrows pointing to the part of a page that the designer is suggested to interact with to input more sample data or action.

Command executions and running of queries can be handled to make sure the simulation can be fulfilled. For example, when a designer logs on the application as a sample user, the password checking is tweaked so that any password is accepted.

In some implementations, a simulation engine suggests to the designer to experience a page as a sample user if it recognizes that certain properties of the page cannot be explained by the designer's current WYSIWYG experience. For example in Submit Paper page, the simulation engine suggests the experience "submit as a sample user" in order to explain to the designer the following properties the display property of the page is set to on—the designer understands this when she sees that the paper info record submitted by the sample user is displayed on the page; the submit property of the page's request form is set on, but max one per user—the designer understands this when she sees that the request form and button disappears once she submits a paper info record; and the edit and remove properties of the page's iterator are set to on.

Note however, that the experience of the first sample user does not fully explain whether the display, edit and remove properties are unconditionally or conditionally on. For example, does the iterator display all records submitted, or only records submitted by the current user? Therefore, the simulation engine subsequently engages the designer to experience as a second sample user. The experience shows that in this page, each user can only see, edit and remove records she has submitted. If this is contrary to requirements, the designer can then either select another template, or customize the individual properties defaulted by the template.

An implementation of the simulation is best explained by introducing derived properties. The application specification includes of primitive properties and derived properties, where the former are more low level (e.g., queries) and their settings cannot be derived by the settings of other properties, while the latter capture combinations of primitive properties that are of importance to the designer. For example, let us assume that a user of the Submit Paper page may submit only one paper. Once the user makes her submission, the form will disappear. At the primitive level, this behavior is achieved by a non-obvious primitive property: The condition associated with the form checks that the set of paper submissions of the currently logged-in user is empty. Understanding the behavior of the Submit Paper form at this level is fairly complex. Therefore the derived property "can a user make more than one submissions" will be associated with this form and be used by the simulation, as described next.

In some implementations, the display aspect of a page is a derived aspect that asks whether a page that has a form also has a report iterator that displays the data submitted at the form. In some implementations, the edit and remove aspects of a page are derived aspects that ask whether the report iterator of the page provides the built-in actions edit and remove.

When the records displayed by iterators and the actions that are available are controlled by complex conditions, it is harder to reason about what sample data and sample users are needed in order to experience a page. For example, obtaining the experience of a assigned reviewer at the Review Assigned Papers page requires that (i) at least one (sample) review assignment has been made and (ii) the designer uses the Review Assigned Papers page as if she were the reviewer. When the conditions have been introduced in response to data-driven design, it is easier to reason about such sample users and data.

One or more of the systems and techniques described herein can summarize a data flow of an application to different levels of detail to achieve the desired level of detail and conciseness. Summarizing a data flow from a high level of detail to a low level of detail may or may not be lossless.

In some implementations, one way to represent data flow of an application is to define nodes as triplets of group, iterator context, and access right so that given an application state, any fact about a user in the group having the right over a record in the context is included in the node. Such nodes are called triplet nodes. In this way, a directed edge from a triplet node comprising group G1, iterator context C1 and action A1 to another triplet node comprising group G2, iterator context C2 and right A2 means that if there exists an application state, a user U1 in group G1, a record R1 in context C1, a user U2 in group G2, and a record R2 in context C2, then U1 executing A1 on R1 (possibly with some form data) may enable/disable U2 to have right A2 over R2.

The triplet nodes cover both read rights and action rights. Notion of nodes for page rights can be defined similarly.

In one embodiment, the system depicts groups in an application by another class of nodes called group nodes in the data flow, so that each group is represented by a unique group node. A directed edge from a triplet node about action A to a group node representing group G indicates that some users may be added to or removed from the group G as a result of the execution of action A.

Figure 3:
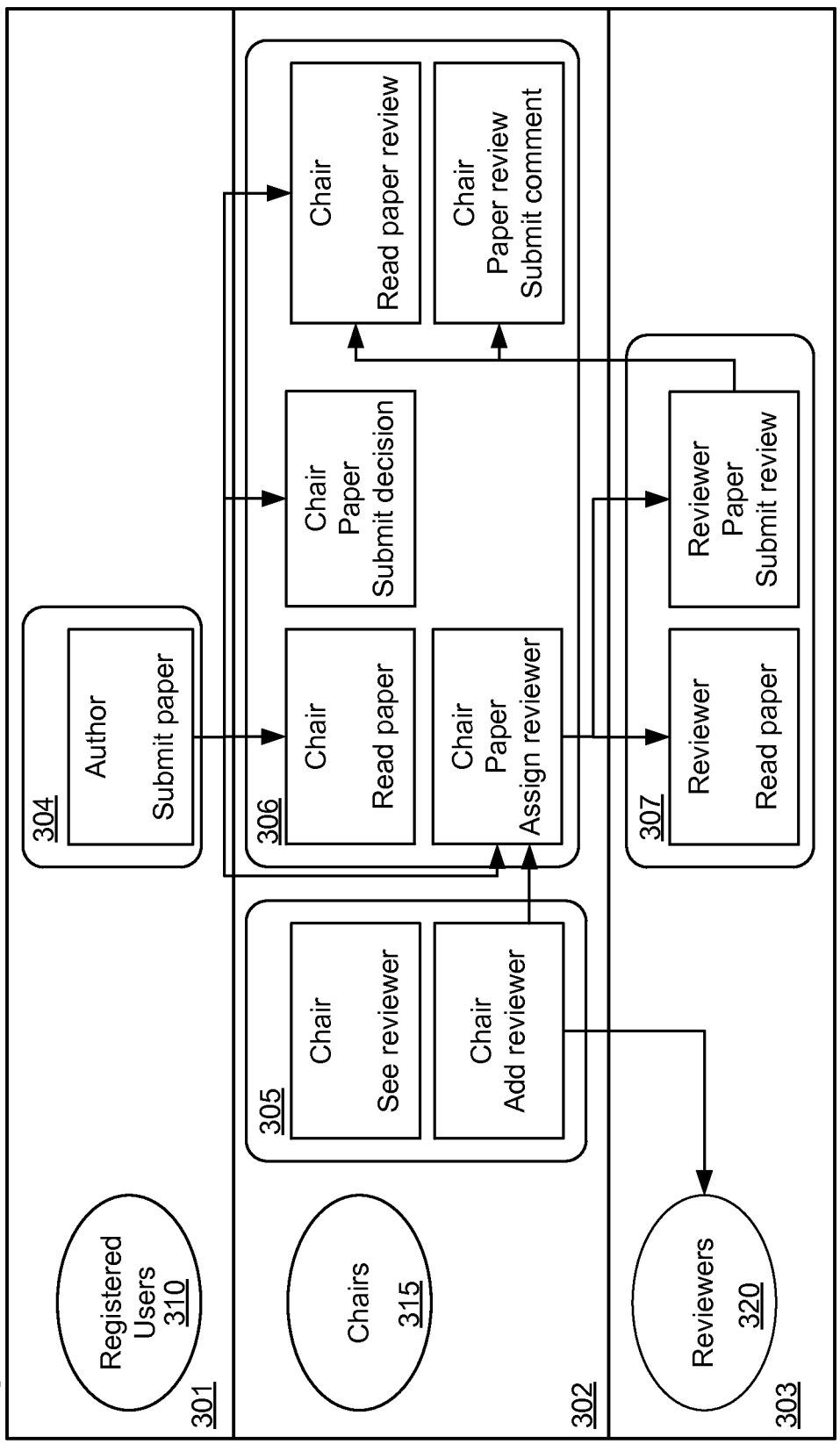
FIGS. 3, 4, 5, 6 and 7 show examples of dataflow diagrams.

FIG. 3 shows a data flow of a reviewing system where triplet nodes are rectangles and group nodes are ellipses. A system can allows swim lanes to be added in a data flow diagram to visualize the participations of different groups in an application. Each group node is placed at the beginning of the corresponding swim lane to represent the respective group. A triplet node is placed into the swim lane that represents the user group of the node's triplet notation. The use of swim lanes in data flow diagram provides a visual effect of demonstrating the rights of user groups and how they interact with each other in the data flow. Swim lanes can be arranged horizontally or vertically. In this example, the swim lanes 301, 302, and 303 represent different user groups in the example application. An application can be associated with users groups such as a group of registered users 310, a group of chairs 315, and a group of reviewers 320.

Pages are depicted in data flow diagrams as non-overlapping boxes that contain one or more triple nodes of the data flow. A node is placed in a box for page P if the iterator context in the node's triplet belongs to page P. FIG. 3 shows page boxes 304, 305, 306 and 307 using rounded boxes.

To convert a more detailed data flow formats to less detailed ones, a design interface can use one or more summarization techniques that can be applied.

Figure 8:
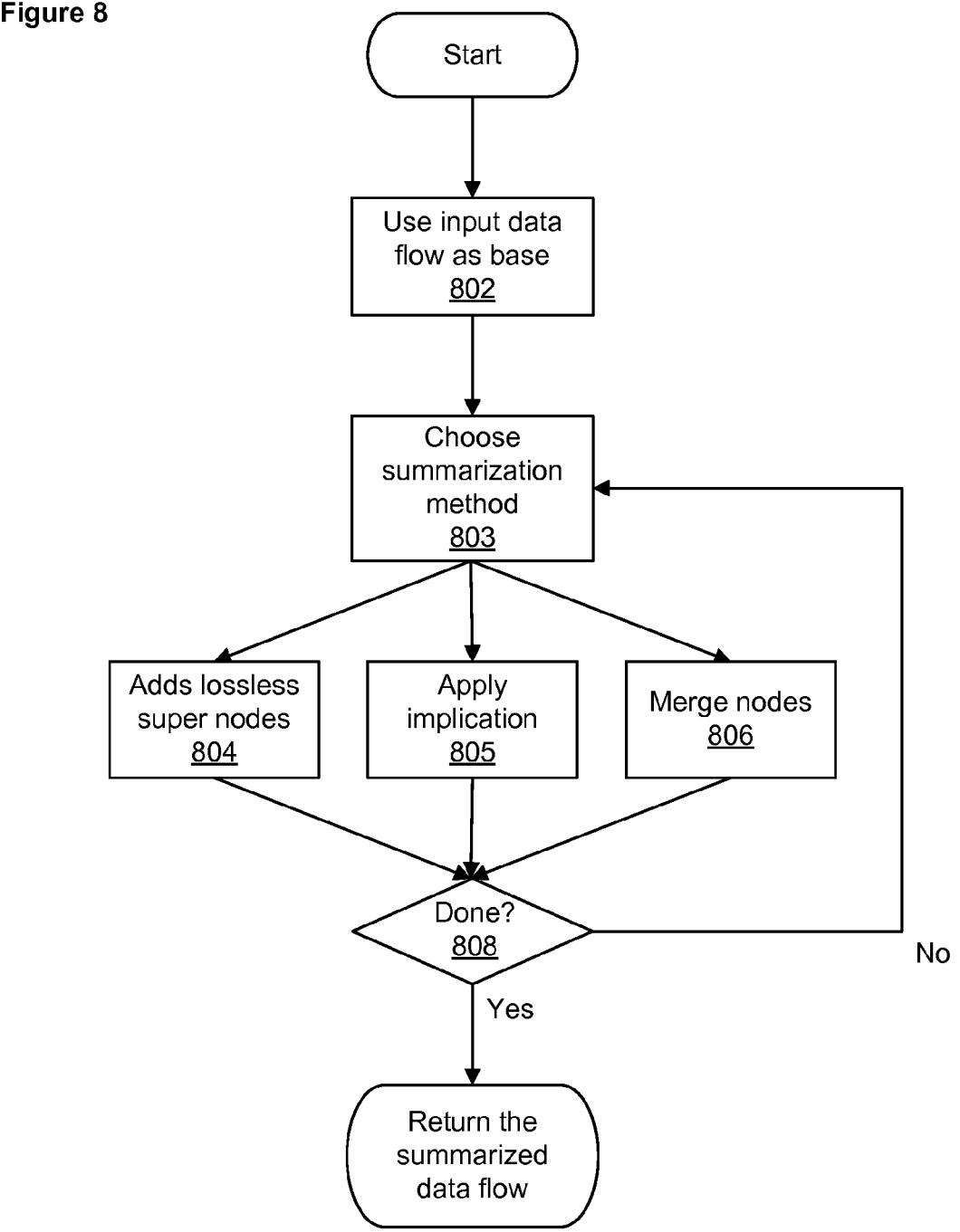
FIG. 8 is an example of a flow diagram of a process of summarizing data flows.

FIG. 8 shows one example of the process of applying different summarization methods until the data flow of the desired level of detail is reached. Step 802 takes the input data flow as the working copy. Step 803 allows the caller (e.g., a user or a program) to choose a summarization method to apply to the current data flow. Step 808 checks whether the desired level of detail is reached and goes back to Step 803 if not. Finally, Step 809 ends the process and return the resulting data flow. Examples of summarization methods include (but are not limited to) Step 804, Step 805, and Step 806 that are explained below.

One way in which the present invention simplifies a detailed version of data flow without loss of information is by introducing super nodes in Step 804. A super node contains a group of nodes in the diagram. For any pair of distinct super nodes, either they are disjoint, or one is completely contained in the other. Page boxes are one kind of super nodes. Any triplet node can be treated as a single super node. The meaning of the existence of an edge to a super node without additional conditions is equivalent to that of the existences of edges from the source node to all the triplet nodes contained in the super node without additional conditions. The definition can be extended to support conditions on edges. By introducing super nodes and replacing some existing edges with fewer edges about super nodes that achieve the equivalent meaning, the present invention simplifies the data flow diagram without loss of information.

Figure 4:
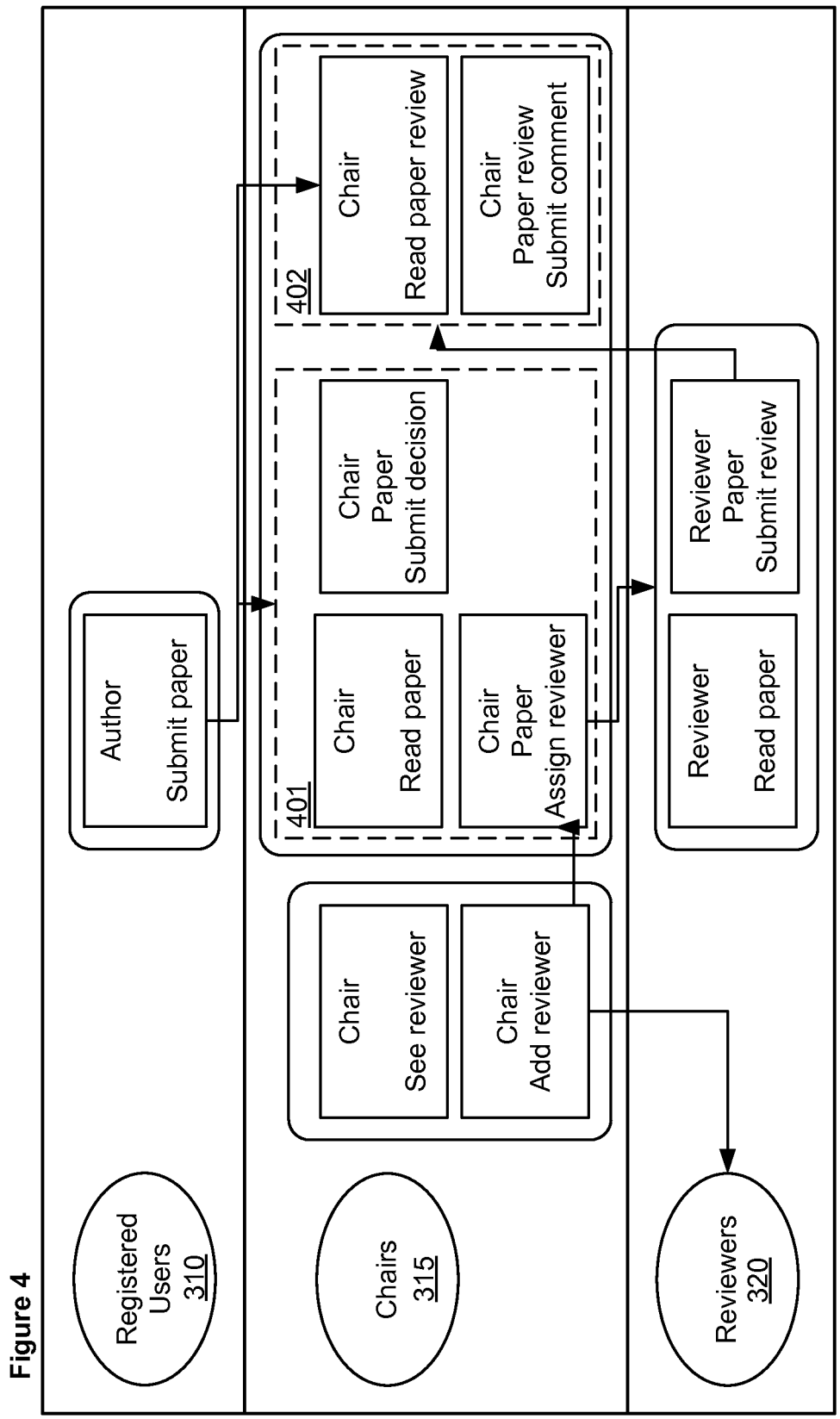

FIG. 4 is an example of use of super nodes where rectangles with dashed edges are used to represent super nodes 401 and 402 in a data flow.

Figure 9:
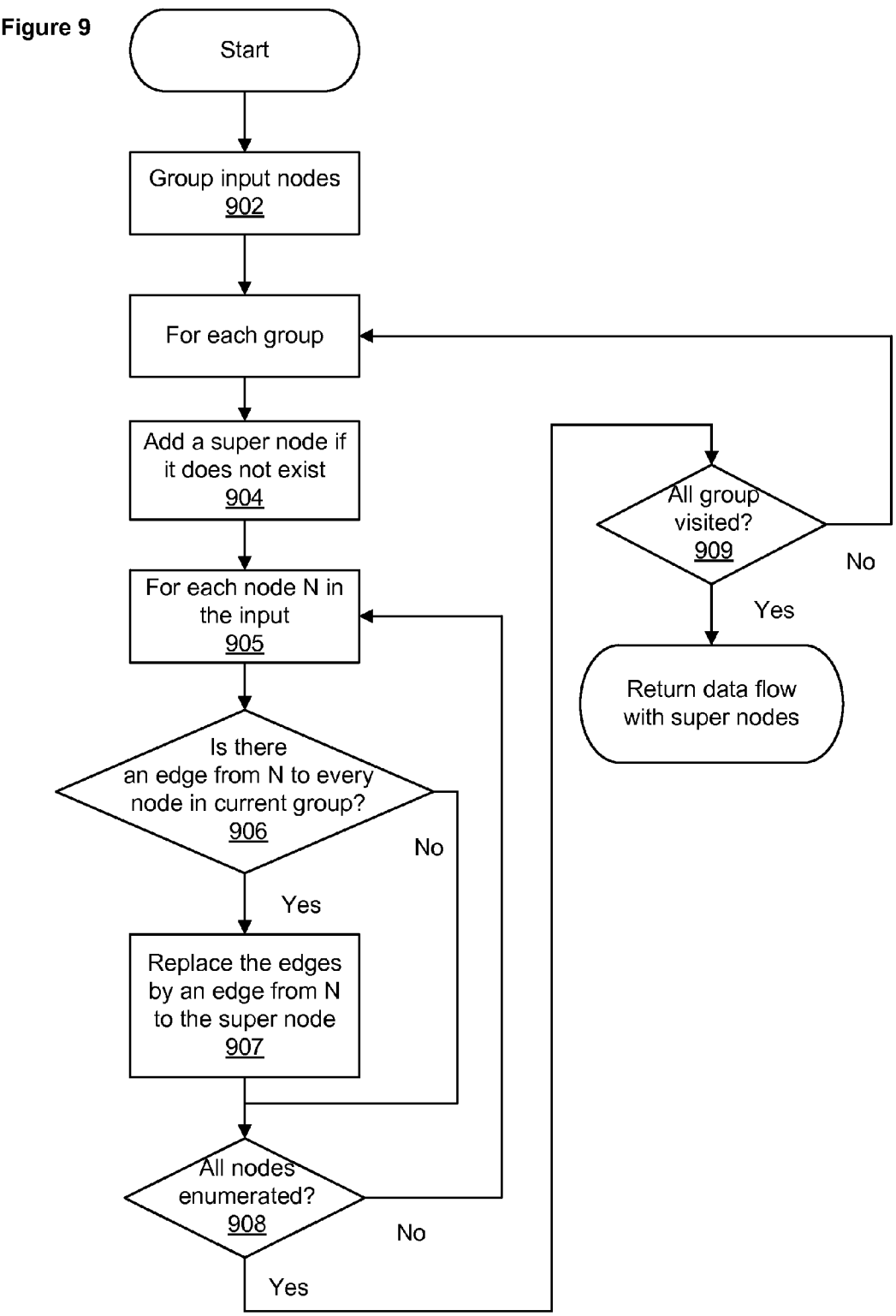
FIG. 9 is an example of a flow diagram of a process of adding super nodes to a data flow.

FIG. 9 shows the steps of one way to create super nodes and add related edges to a data flow in the present invention. First, in Step 902, the grouping of nodes is obtained which is explained in detail later. Then, in Step 904 creates for each group a super node if it does not already exist. Steps 905, 906, 907, and 908 add new edges to the super node to replace existing edges following the semantics of edges. Finally, Step 909 outputs the summarized data flow with super nodes.

The present invention supports multiple methods of grouping nodes in a data flow to create super nodes. The methods of grouping triplet nodes to create super nodes include, but are not limited to the following:

The present invention treats the detail data flow as information combined from different dimensions such as (without limitation) the group dimension, the iterator context dimension, the action dimension, and the page dimension, and supports grouping based on any single dimension or any combination of multiple dimensions.

Figure 10:
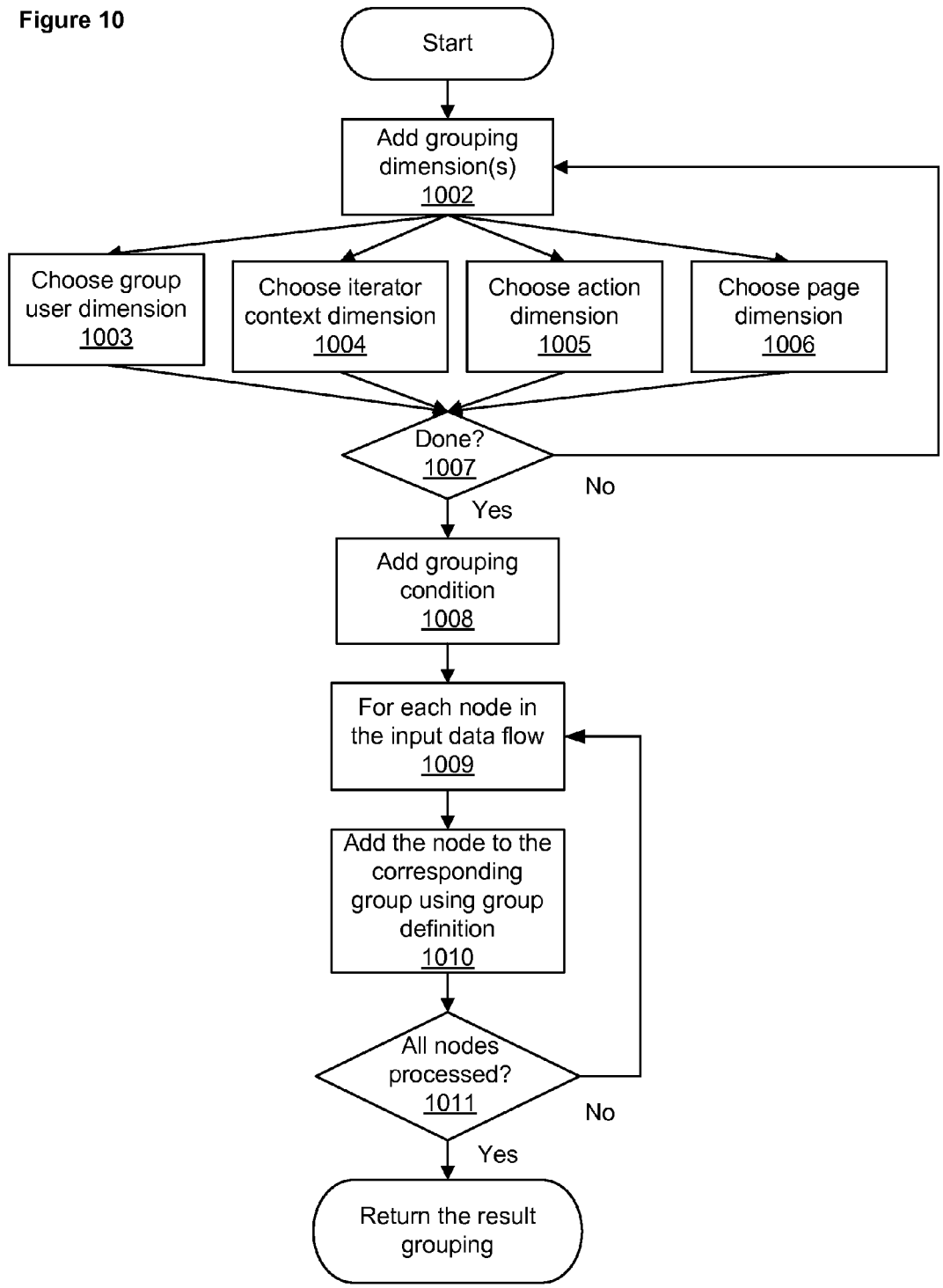
FIG. 10 is an example of a flow diagram of a process of grouping nodes in a data flow.

FIG. 10 shows one process to define grouping and to create groups in the present invention. First, in Step 1002, one or more dimensions are selected as the grouping dimensions. Implementations can include choosing one or more of: a group user dimension 1003, an iterator context dimension 1004, action dimension 1005, or page dimension. If not done 1007, repeat step 1002. In Step 1008, the grouping condition with respect to the selected dimensions is collected. Then nodes in the input data flow are grouped using the grouping condition on the selected dimensions by Steps 1009, 1010 and 1011. The resulting groups are returned in Step 1012.

One way of grouping covered by the present invention is to use all dimensions except the action dimension. More specifically, for each user and each iterator context of a page that is used in more than one triplet node, create a new super node by grouping these triplet nodes with the same iterator context. FIG. 4 is an example of adding super nodes by applying this way of grouping to the data flow shown in FIG. 3.

A design interface can simplify a data flow diagram without loss of information by using implications among nodes. For example, based on an observation that a user being able to take an action on a record implies that the user has the read right of the record, a triplet node N1 comprised of user group G, iterator context C, and right A1 where A1 is the read right can be removed from the data flow if there exists another triplet node N2 comprised of G, C, and action A2 that satisfies the following condition: For any edge that ends at N1, without consideration of conditions on edges or disablement, there exists another edge that has the same source node and ends at N2.

A design interface can summarize a data flow diagram by merging grouped triplet nodes into atomic nodes so that the resulting nodes cover multiple group/data/action combinations represented by merged triplet nodes. The same grouping techniques for creating super nodes apply to merging. Examples includes (but are not limited to) merging nodes with same iterator context (i.e., dropping the action dimension) and merging nodes in the same page (i.e., keeping only the page dimension). On visualization level, optional explanations are added to each node after merging to indicate the group/data/action combinations represented by it. The merging reduces the number of nodes and the number of edges in the data flow diagram.

Figure 11:
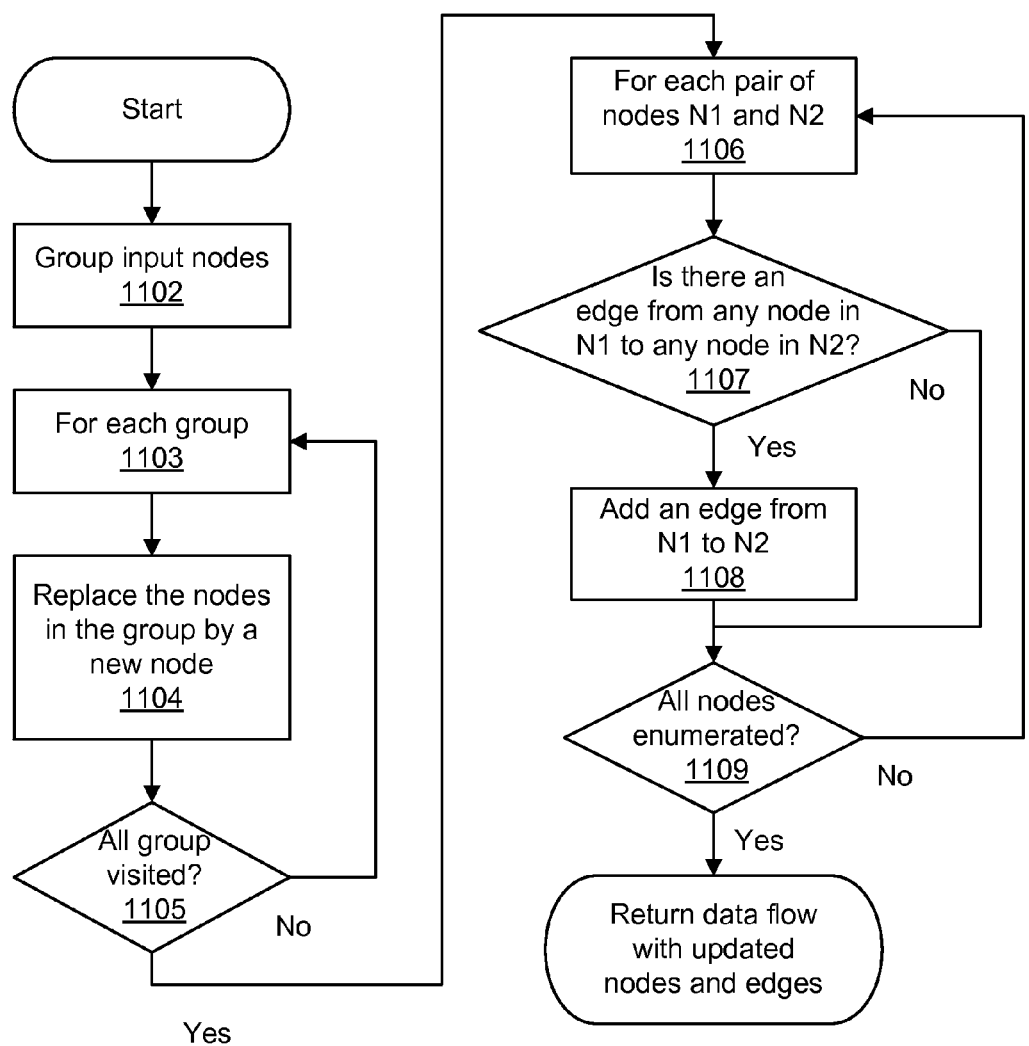
FIG. 11 is an example of a flow diagram of a process of merging nodes in a data flow.

FIG. 11 shows the steps of one way to merge nodes in a data flow in the present invention. First, Step 1102 obtains the grouping of nodes. Then, Steps 1103, 1104, and 1105 create new nodes for each group. Steps 1106, 1107, 1108 and 1109 add edges to or from resulting nodes after merging according to the semantics of edges. Finally, Step 1110 returns the summarized data flow with updated nodes and edges.

Figure 5:
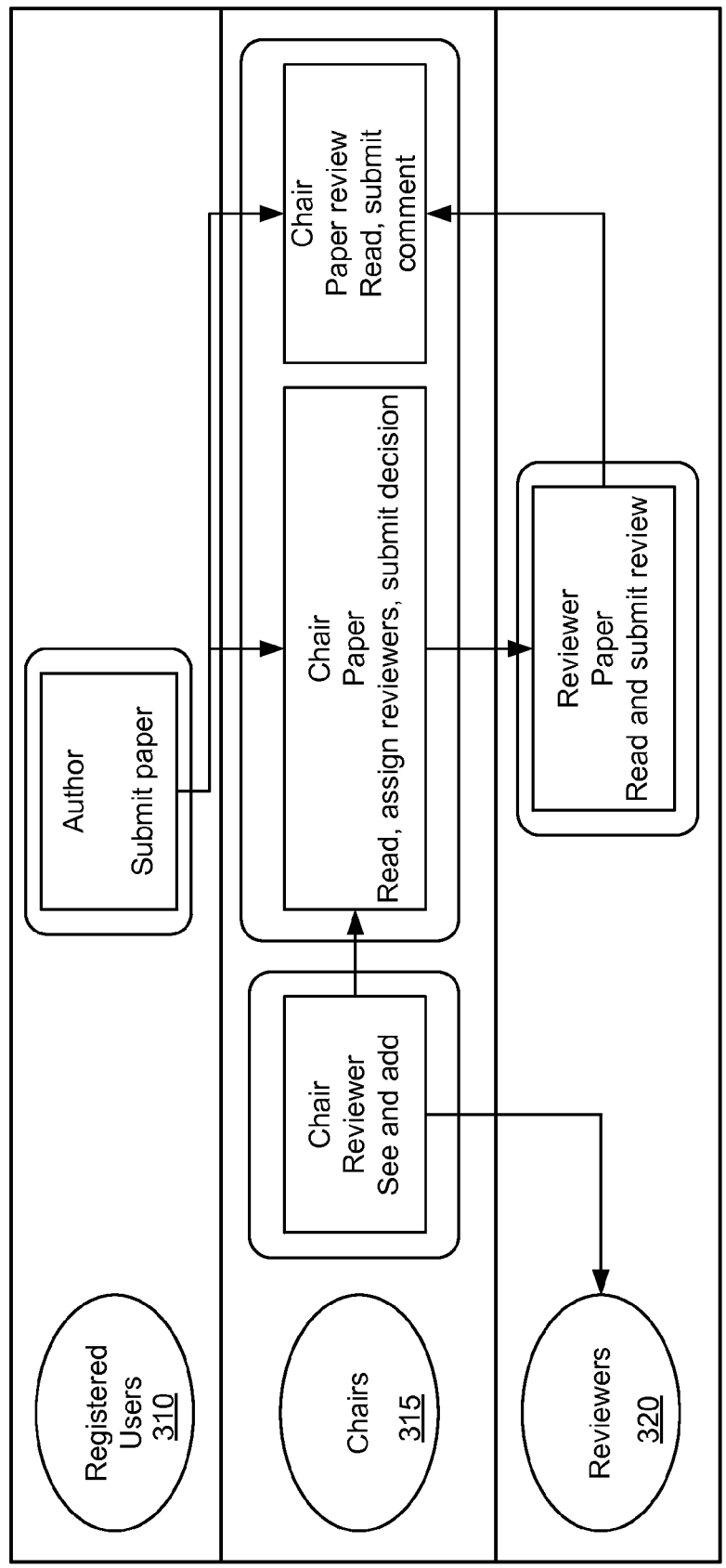
Figure 6:
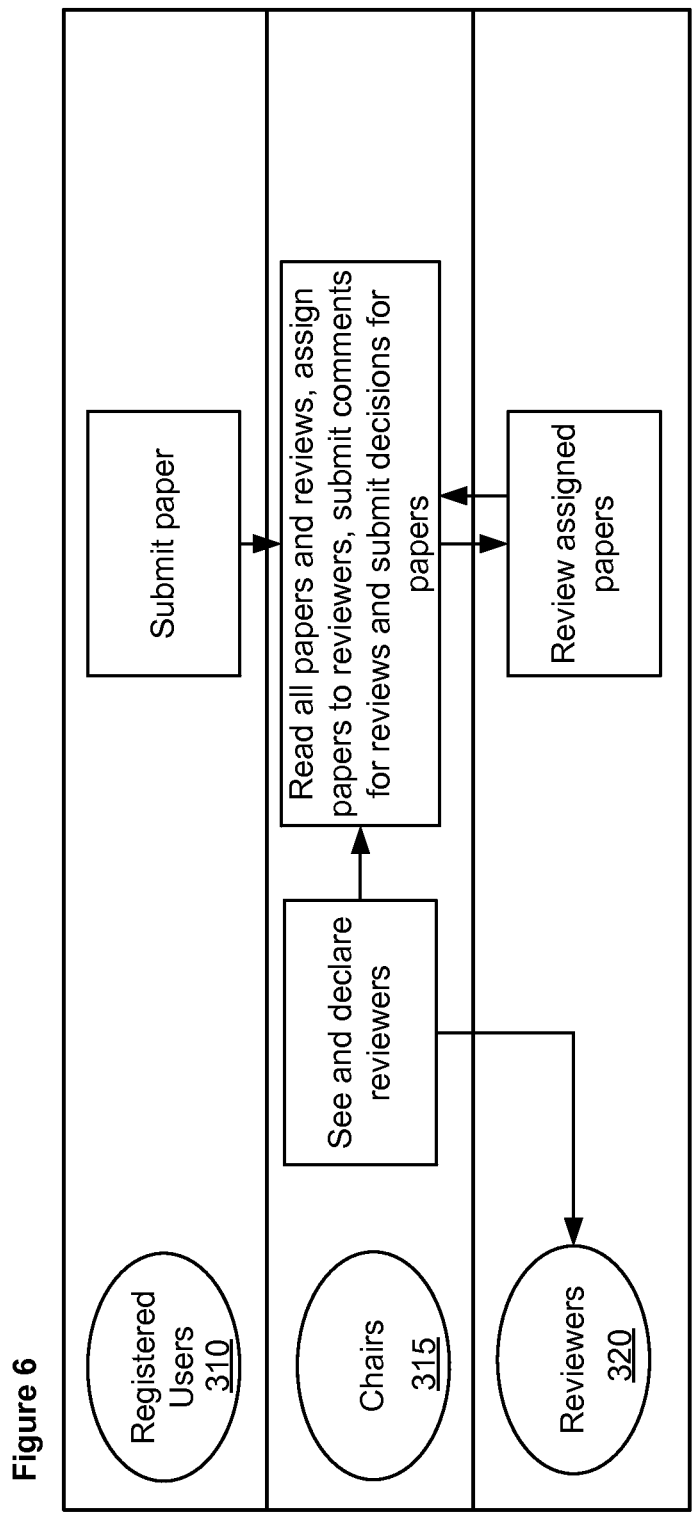
Figure 7:
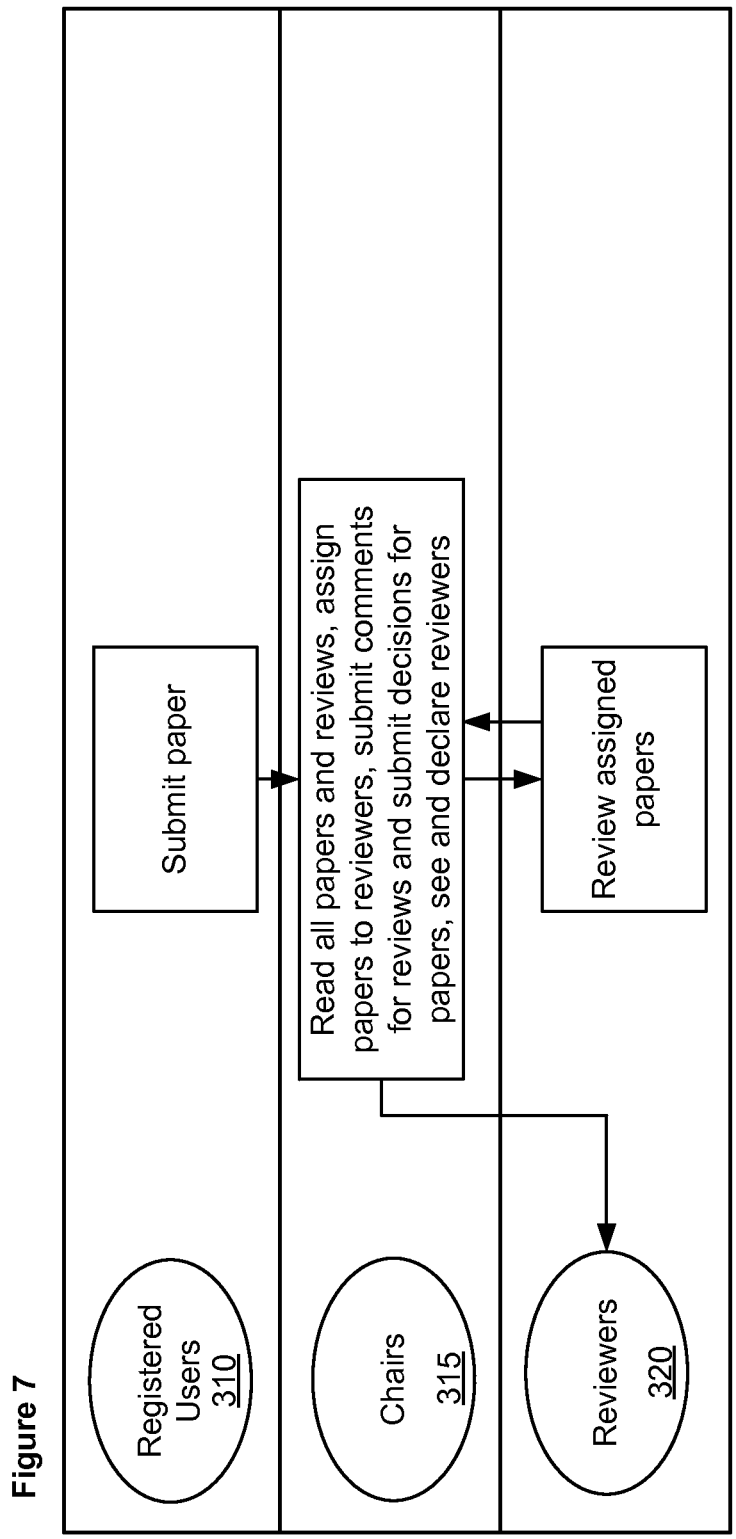

For example, FIG. 5 shows a data flow resulted from merging triplet nodes by dropping the action dimension. FIG. 6 shows a data flow resulting from merging triplet nodes by dropping the action and the iterator context dimensions, i.e., keeping the group and the page dimensions only. FIG. 7 shows a data flow resulting from merging triplet nodes by dropping the action, the context, and the page dimensions, i.e., keeping the group dimension only.

A technique for data flow analysis can include inferring one or more data flows from a specification of an application. Data flows can be inferred from application specifications by static analysis of commands and queries.

In addition to commands and queries, metadata may also be used for the inference of data flow from application specifications. Metadata of actions provide information that may facilitate the inference. Examples of metadata includes (but are not limited to) declarative specification of the actions' conditions and effects, and direct relations between actions and pages collected by wizards (such as the one of Method 4) from designers at design time.

For example, an edge from the "Submit Paper" page to the "All Papers" page can be established without analyzing the conditions and effects of actions if the wizards provides the metadata that states with a high level derived aspect that the submit action in the former page reports papers to the latter page.

Figure 12:
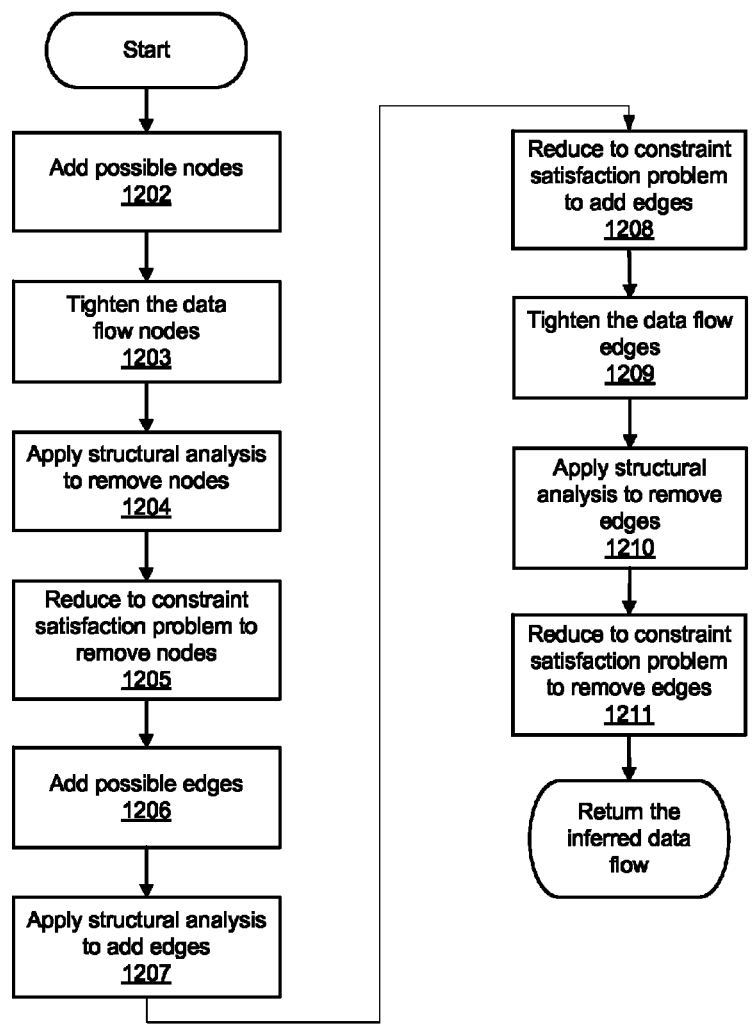
FIG. 12 is an example of a flow diagram of a process of inferring data flow from application specification.

FIG. 12 shows one method of inferring data flows from application specifications in the present invention. The method allows data flows to be created at various degrees of completeness and tightness. In particular, a tighter data flow is of more interest since it is more precise and also since a less tight data flow may be created from a tighter data flow using summarization methods.

Step 1202 adds a node to a data flow. Given user groups and iterators in an application specification, one embodiment creates nodes by enumerating the following: for every combination of a user group and a page output a node describing the page right facts that users from the user group can access the page; for every combination of a user group and an iterator output a node describing the read right facts that users from the user group can read data reported by the iterator; for every combination of a user group, an iterator and an action output a node describing the action right facts that users from the group can execute the action on the records reported by the iterator.

Step 1203, 1204 and 1205 remove unreachable nodes from the data flow. A node is unreachable if it does not include any fact with respect to any application state in any possible run. Different embodiments may choose different implementations to achieve this, such as structural analysis if the application specification supports it, or reduction to constraint satisfaction problems. Examples of structural analysis include (but are not limited to) the case that when the language of condition declaratively specifies which user groups are associated with an action, the nodes relating to unassociated groups and this action can be removed. When structural analysis is not possible, an embodiment may reduce checking whether a node is redundant by definition to constraint satisfaction problems, and then apply solutions from related work.

Steps 1206, 1207 and 1208 add edges to the data flow and improve the completeness. This can be done by structural analysis if possible, or reduction to constraint satisfaction problems. Without limitation, one example of structural analysis in adding edges is when condition queries and program commands are SQL statements the execution of an action may enable/disable another action only if the former's commands modify the tables that are used in the latter's condition queries. In this case, an edge is added if there is a table that appears in both the command of the source node's action, and the condition query of the target node's access right. Steps 1209, 1210 and 1211 remove edges from the data flow and tighten the data flow (per definition of tightness).

As an example, we will consider an embodiment of a data flow inference engine and describe how a data flow can be created for the online paper reviewing application of the running example given the application specifications where most conditions and commands are SQL statements.

First, the inference engine adds possible nodes to the data flow by enumerating the combinations of group, access right, pages and iterators and creating a node for each combination. For example, the possible nodes added include a node describing the facts that "some registered user can submit a paper" and another node describing the facts that "some reviewer can access the All Papers page". Notice that the former node is a valid node, while the latter is unreachable.

The data flow inference engine then removes all unreachable nodes from the data flow. Suppose the All Papers page's condition query is a SQL statement granting access right only to users in the Chairs group. Then the inference engine can analyze the condition query and conclude that existing nodes about page right facts that "All papers" page can be accessed by users not from Chairs group are unreachable and should be removed. As a result, the node describing the facts that "some reviewer can access the All Papers page" is removed from the data flow.

After unreachable nodes are removed, the data flow inference engine adds edges to the data flow. This is facilitated by the commands and conditions written in SQL. The inference engine examines each ordered pair of nodes and adds an edge between them if structural analysis indicates that the execution of any fact included in the first node can enable or disable another fact in the second node.

For example, consider a pair of nodes including of a node N1 about the action right for registered users to submit papers in the "Submit Paper" page and a node N2 about the read right for chairs to read records of papers in "All Papers" page. Since the submit action uses a SQL command to insert into the database table containing records about papers, and the paper iterator in the "All Papers" page reports records in the same table using a SQL query, the inference engine observes this connection and adds an edge from N1 to N2.

By using structural analysis of application specifications, a data flow diagram similar to that shown in FIG. 3 can be constructed by the inference engine.

A design interface can infer one or more application specifications using an action wizard. An application may be created by visual manipulation of pages involving forms, actions and reports. This technique is referred to in the literature as WYSIWYG or DIY creation of application. The method enables the design interface to allow specification of custom actions through action wizards that enumerate and verbalize the effects of an under-design action on user/access right pairs, and then ask additional questions towards creating a visual structure.

Application functionality can be built using the page-driven design of WYSIWYG creation. For example, the submit edge from Submit Paper in FIG. 21 happens because the owner ordered at the page wizard that the All Papers reports the data collected on Submit Paper. However, designers often want to capture more elaborate workflow logic, which leads to application functionality that cannot be easily-built through page-driven design.

Figure 21:
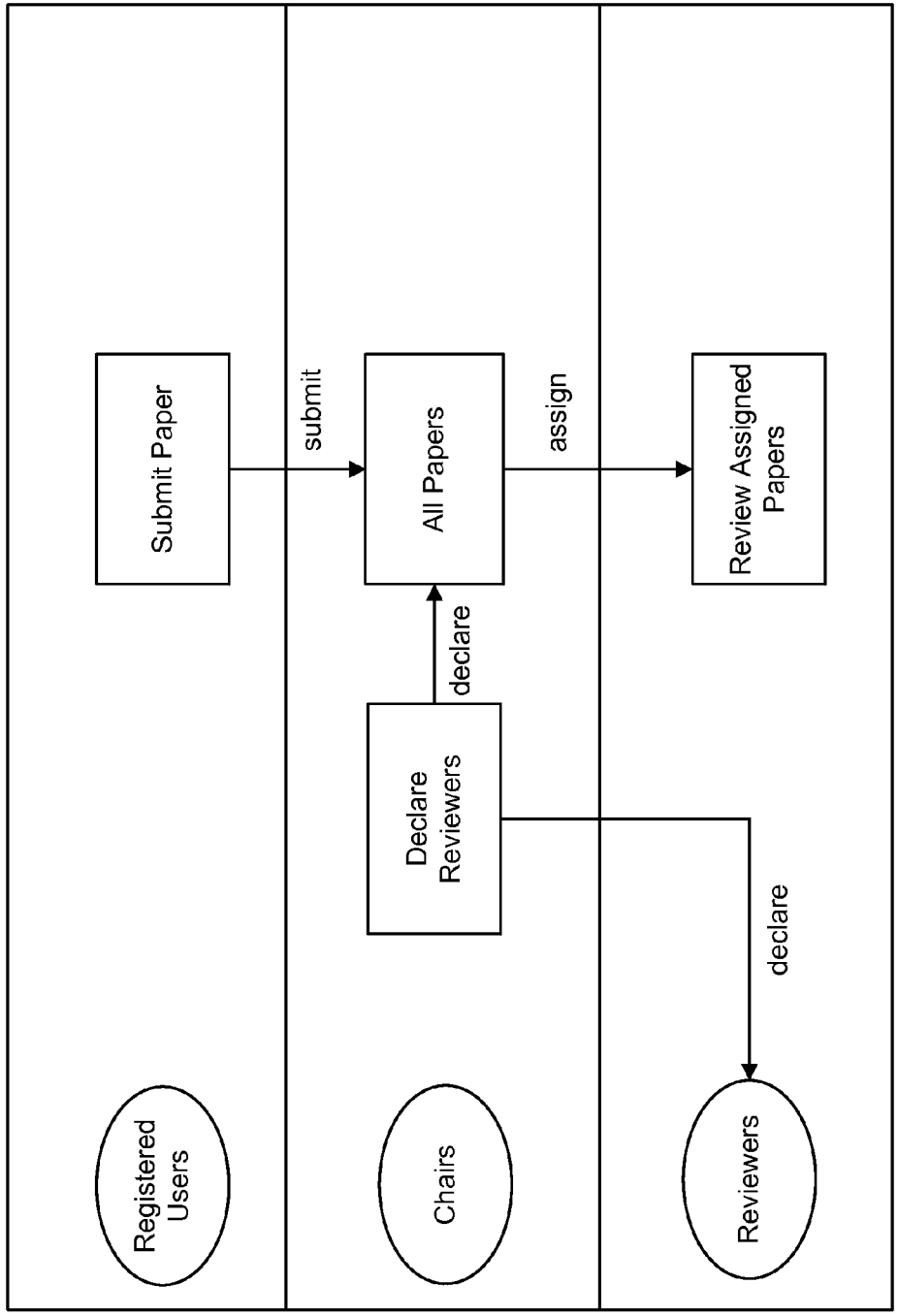
FIG. 21 shows an example of a data flow diagram.

Consider in FIG. 21 the assign edge from page All Papers to page Review Assigned Papers, accessible to reviewers. Here, the chairs may solicit reviews for each paper from a subset of the reviewers. Using page-driven design, the designer has to add an annotation (action) to All Papers so that chairs can choose the reviewers to assign papers to. Then she needs to create the Review Assigned Papers page, for the reviewers to submit their reviews, by initially reporting all the papers from the All Papers page, and then keep only those where the currently logged-in user is one of the reviewers chosen to assign a paper to; not a simple condition to state regardless of how friendly the query building GUI is. Indeed, the query in SQL is:

```
SELECT *
FROM Submit_Paper
WHERE EXISTS (
SELECT *
FROM Assign
WHERE Assign_ref = Submit_Paper.ID
AND reviewer= $current user>)
```

The Assign table folds the reviewers chosen (reviewer column) by the assigned reviewers for each Paper (Assign_re-F column). The Assign_re-F column is a foreign key referring to the ID of a Paper. The reviewer column is a foreign key referring to the ID of an reviewer and the condition makes sure that the assigned reviewer is the currently logged-in user.

Deconstructing a single data flow transition into the above application specification is not a trivial task for the designer. For that reason, the present invention enhances page-driven design with an action wizard that prompts for specifications from the perspective of a high-level data flow, and subsequently uses an application inference engine to infer the queries/commands that are necessary for enforcing the corresponding access rights in an application.

A design interface can prompt for action specifications with an action wizard. Suppose an action $A_1$ in iterator context $C_1$ is accessible by user group $U_1$, and invoking $A_1$ activates a program that updates the application state such that action $A_2$ in iterator context $C_2$ becomes either accessible or inaccessible by user group $U_2$. Let us name the access rights of $A_1$ the Acting Rights, comprising $A_1$ the Acting Action, $U_1$ the Acting User Group and $C_1$ the Acting Context. Similarly, name the enabled/disabled access rights of $A_2$ the Affected Rights, comprising $A_2$ the Affected Action, $U_2$ the Affected User Group and $C_2$ the Affected Context.

The method enables the design interface to allow specification of custom actions through action wizards that prompt for the Affected Rights of actions, and infers the programs, queries and other aspects of the application specification necessary to implement the Affected Rights.

Figure 13:
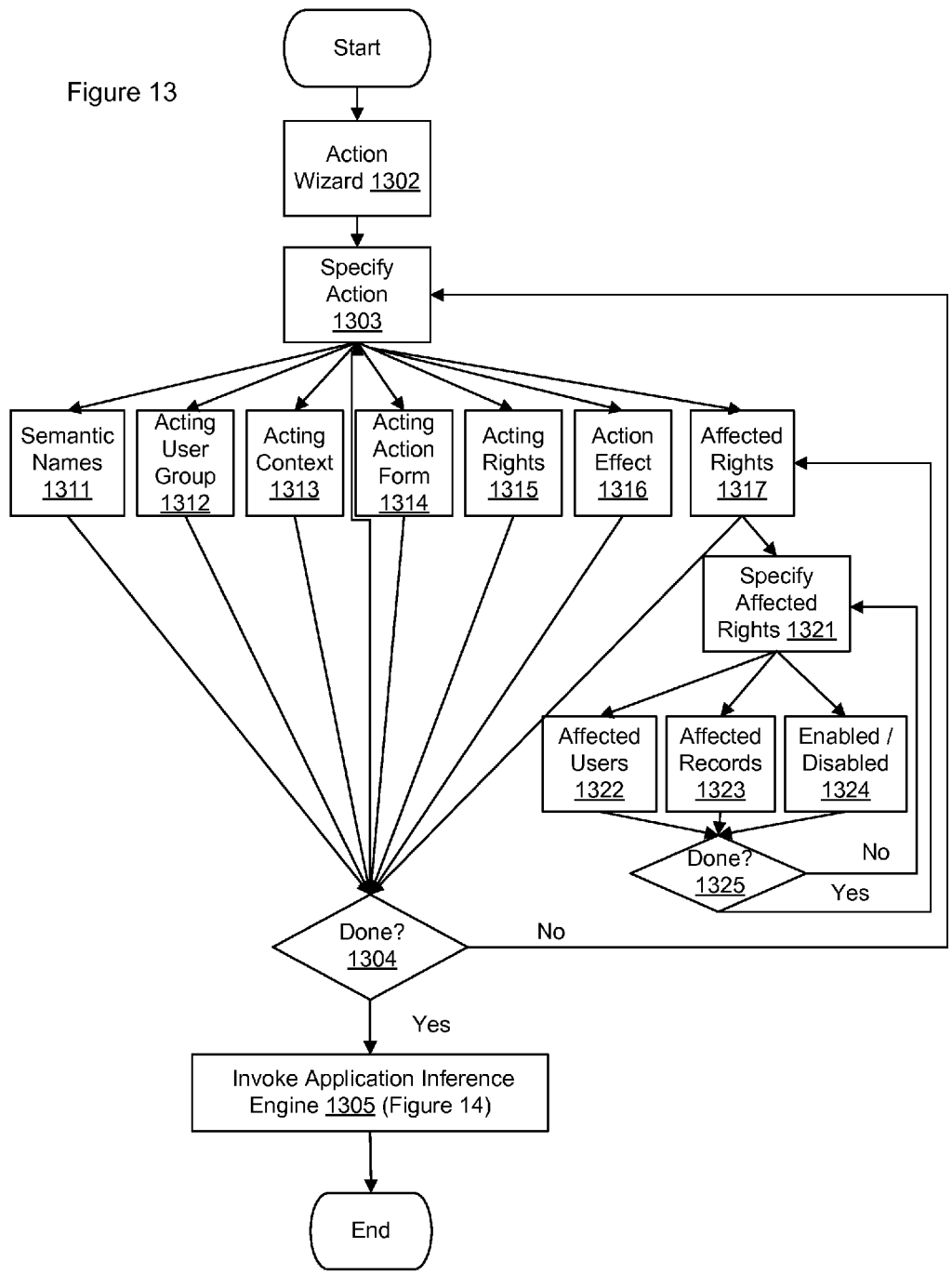
FIG. 13 is an example of a flow diagram of a process of specifying an action using wizard.

FIG. 13 is an example of a flow diagram of a process of specifying an action using wizard. This flow diagram provides an overview of how an action wizard 1302 prompts the designer to specify 1303 the specification of an action. At each step, the wizard allows the designer to choose among a list of enumerated suggestions (one of which is chosen by default), or provide a specification manually. Each of the steps can be performed zero, one or more times by the designer. Where the designer does not perform a step, the wizard uses the default value for a prompt.

In Steps 1311-1316 the wizard prompts for specifications related to the Acting Rights, whereas in Steps 1317-1325, the wizard prompts for specifications related to the Affected Rights.

In Step 1311, the wizard prompts for semantic names associated with the action. Such semantic names allow the design interface to subsequently issue prompts in plain, easy-to-understand language. Without limitation, in one embodiment, the wizard prompts for a verb for the action name, a noun for the Acting User, and a noun for the Acting Record. Using the verbs and nouns, the design interface subsequently uses a software inflector to construct grammatical phrases in prompting and enumerating suggestions for the designer.

In Step 1312, the wizard prompts for the Acting User Group. Without limitation, in one embodiment, the wizard suggests the existing user groups, or creating a new user group. If the design interface is currently displaying a page, the first user group that has the page rights will be chosen by default.

In Step 1313, the wizard prompts for the Acting Context. Without limitation, in one embodiment, the wizard suggests the existing iterator contexts of the application or creating a new iterator context. If the design interface is currently displaying a page, the wizard suggests instead the existing iterator contexts of the page or a new iterator context.

In Step 1314, the wizard prompts for the Acting Action Form. Without limitation, in one embodiment, the wizard suggests copying existing forms, or creating a new form. If the Acting Action Form is a new form, the wizard prompts for the respective form fields in the form.

In Step 1315, the wizard prompts for a condition query for the Acting Rights. Without limitation, in one embodiment, the wizard prompts for the designer to write a Boolean expression that uses a list of allowable variables. For example, the Boolean expression can check if the current time is past a deadline.

In Step 1316, the wizard prompts for the Action Effect, which specifies the program that is activated when the action is invoked. Without any limitation, in one embodiment, the program for the Action Effect is specified as a sequence of pre-packaged services, such as sending notification emails or charging a credit card transaction. Each service exposes a schema for its input data. For example, a credit card service's input schema necessarily includes the credit card number and the amount to charge. The wizard further simplifies the ease of specification by prompting the designer to map the input received by the program into the input received by each service. Each service may also require the wizard to prompt for additional specification. For example, a credit card service requires the specification of the payment processor's host name and the merchant particulars.

In Steps 1317-1325, the wizard prompts for one or more specifications of the Affected Rights. In order to infer the correlation between the Acting Rights and the Affected Rights, the wizard considers a hypothetical invocation of the Acting Action, where an Acting User invokes the action on an Acting Context Record of the Acting Context. Users referenced in the Acting Context Record are Acting Context Users, whereas the users referenced in the Acting Form Record are Acting Form Users. The hypothetical invocation results in Affected Users gaining or losing access rights to Affected Actions on Affected Records.

In Step 1322, the wizard prompts for the Affected Users, which can be specified to be any of the following: the Acting User, one or more users from the Acting Context Users, one or more users from the Acting Form Users, one or more users that are computed with a query parameterized by one or more of the above. This can include a user group, a named user or no users.

In Step 1323, the wizard prompts for the Affected Records, which can be specified to be any of the following: a record encompassing the Acting User, the Acting Context Record, the Acting Form Record, and one or more records that are computed with a query parameterized by one or more of the above. This can include the entirety of the records of a report of the application, a record with constants, or no records.

In Step 1324, the wizard prompts whether the invocation causes the Affected Rights to be enabled or disabled. Where there are other action invocations that also affect the Affected Rights, the wizard prompts for a condition query that indicates how the action invocations are correlated with each other. Without limitation, in one embodiment, the wizard prompts for whether all action invocations are needed for the Affected Rights to be enabled/disabled (conjunction), or whether any action invocation can cause the Affected Rights to be enabled/disabled (disjunction).

In Step 1304, the designer indicates that all specifications have been provided. Consequently, in Step 1305, the wizard invokes the application inference engine to infer the data structures that need to be created in the application specification.

Figure 14:
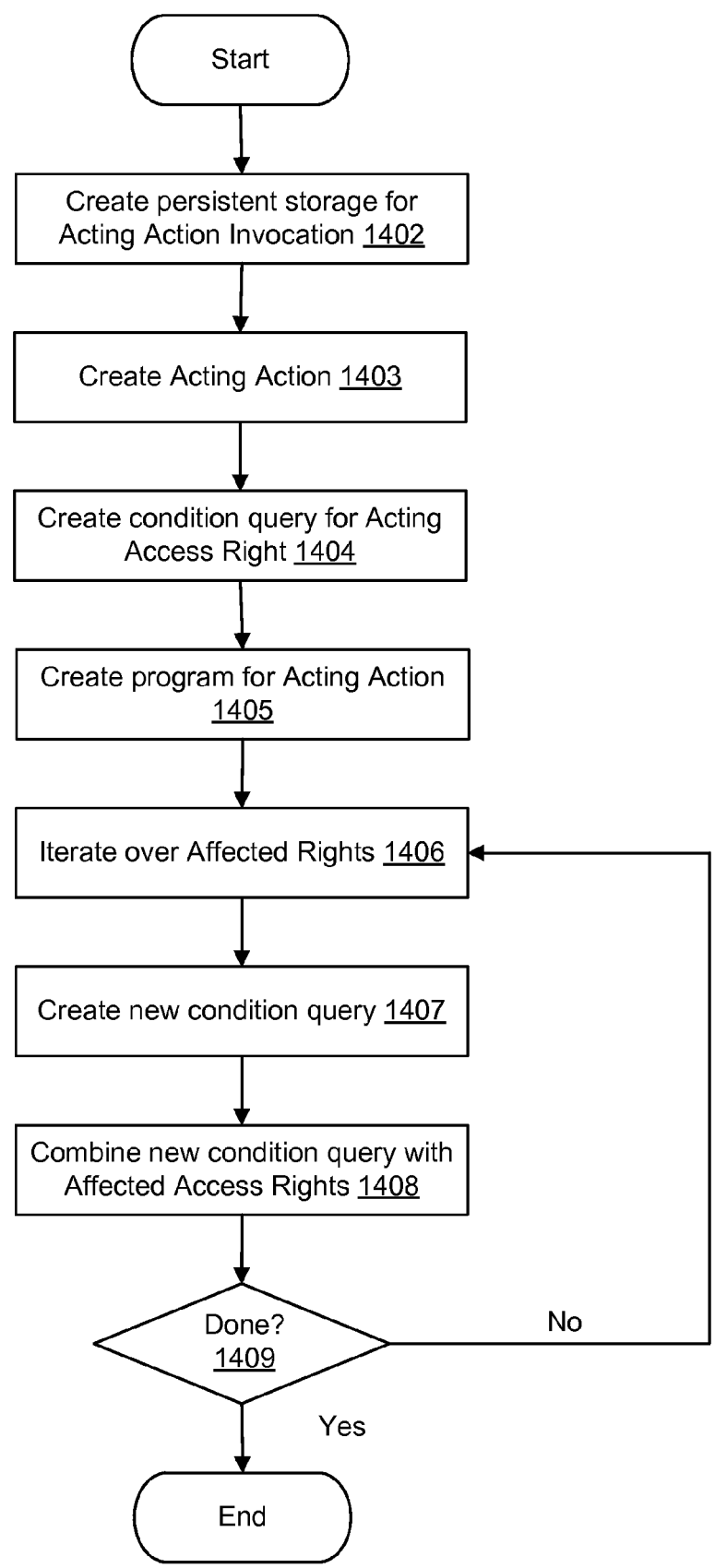
FIG. 14 is an example of a flow diagram of a process of inferring queries and commands from specifications.

FIG. 14 is an example of a flow diagram of a process of inferring queries and commands from specifications. This flow diagram provides an overview of how the application inference engine uses the specifications for the acting access rights and affected access rights respectively to infer the underlying queries and commands that are required in the application, so that the application enforces access rights conformant to what the designer has specified. Steps 1402-1405 infer the queries and commands for the new action to be created, whereas steps 1406-1409 infer the modifications needed for the condition query of each affected access right. For ease of illustration, the sequence is explained using the scenario of creating a new action. This disclosure also contemplates arrangements of the sequence for modifying existing actions, as will be apparent to those of ordinary skill having the benefit of this disclosure.

In Step 1402, the engine creates the persistent storage in the application state that will track that an acting action invocation has occurred. The storage needs to track information including the acting action, the acting user and the acting record. Additional metadata such as the time of action invocation, the IP address of the acting user's client machine etc. may also be included. Without limitation, in one embodiment, a database table is created, with an attribute for the acting action, an attribute for the acting user, and a copy of all attributes of the acting record.

In Step 1403, the engine creates the data structure for the acting action, using specifications for the action name 1311, the associated iterator context 1313, and the associated action form 1314.

In Step 1404, the engine creates the condition query for the acting access right, using specifications for the acting user group 1312, the associated iterator context 1313, and details specifications for the access rights 1315. Without limitation, in one embodiment, where queries are implemented in SQL, the condition query returns true if the current user is contained in the results of the user group query, and the parameterized query provided by the designer returns true.

In Step 1405, the engine creates the program for the acting action, using specifications for the Action Effect 1316. In addition, the engine adds to the program a command that will modify the data in the persistent storage of Step 1402 when the action is invoked. Without limitation, in one embodiment where the persistent storage is a database table, the additional procedure will cause a tuple to be inserted in the database table (with the corresponding values for the attributes) when the action is invoked.

In Steps 1406-1409, the engine iterates over each affected access right specified in 1317, and either creates the condition query of the affected access rights where it does not previously exist, or modifies it if it already exists.

In Step 1407, the engine creates a new condition query Q' that captures the requirements for one specification of affected users 1322, affected records 1323 and whether the invocation causes the affected rights to be enabled or disabled 1324. Q' is a condition query for (part of) an access right, and returns true or false for a given user, action and record. Q' returns true for enablement (false for disablement) if all of the following are true: a condition query for the affected users returns true, where the condition query checks if the current user is contained in the set of affected users; a condition query for the affected records returns true, where the condition query checks if the record is contained in the set of affected records.

In some implementations, the query is implemented as SQL where Q' involves using the database table for the action invocation in order to obtain the set of the affected users and the set of affected records. In the following example, Q' uses Assign_Action, which is the database table tracking the invocation of the assign action. The condition query checks that the affected user is an action form user (which has been stored in the assign_to attribute), and the affected record is the acting context record (which has been stored as a foreign key in the paper_re-F attribute). The action is fixed (as the query is associated directly with an action), whereas the user and record as passed as parameters $user and $record.

```
SELECT EXISTS(
SELECT *
FROM assign_action
WHERE a.assign_to = $user
AND a.paper_ref = $record
)
```

In Step 1408, the engine either uses the new condition query Q' directly for the affected access rights if there is no existing access rights, or combines the condition query Q' with the existing affected access rights. In the latter case, the condition query as specified in 1324 is used to determine how the condition query Q' is correlated with the condition queries of other acting actions. Without limitation, in one embodiment where the queries are implemented in SQL, and only either conjunctions or disjunctions are allowed, the existing condition query for the affected access rights is combined conjunctively (or disjunctively, depending on 1324) with Q'.

Figure 19:
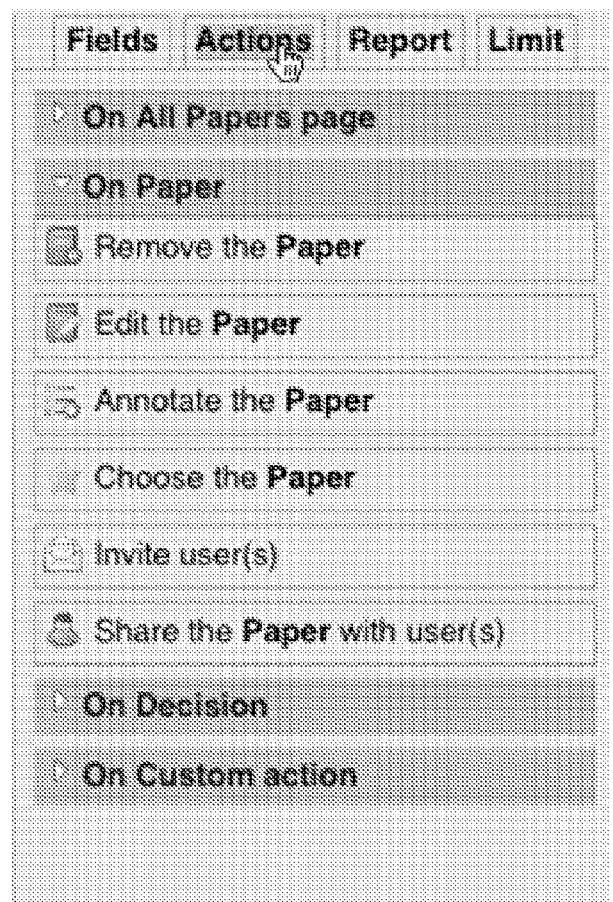
FIG. 19 shows an example of action patterns.

A design interface can use one or more common action patterns. Common patterns occur for actions in an application. For example, a Share action may be commonly perceived as one where the Affected Records encompass the Acting Context Record, whereas an Invite action may be commonly perceived as one where the Affected Users are one or more users from the Acting Context Users. For each such action pattern that is identified the action pattern can be verbalized as a grammatical phrase utilizing semantic names. An exemplary verbalization in the English language is a phrase where the action name is used as a verb and the Acting Record is used as an object noun, and there is a phrase for each action and report combination on a page. FIG. 19 illustrates this example verbalization. For each such action pattern that is identified, the wizard can infer the appropriate specification from the action pattern. The inferred specification may be left as a default that the designer can subsequently modify, or be entirely hidden from the designer in the interest of simplicity. Both approaches are applicable independent of whether the wizard provides options/suggestions for the respective prompt, or otherwise.

A non-comprehensive list of common action patterns is as follows for illustration. Annotate: The Action Form has an input text field. The Action Effect has a program that inserts the Acting Context Record and the Action Form Record into a database. Remove: The Action Effect has a program that removes from the database the records that correspond to the Acting Context Record, using the view update semantics and cascade policies specified. Edit: The Action Form has a field for some or all fields of the Acting Report. The Action Effect has a program that updates the database with the Action Form Record, using the view update semantics specified. Email: The Action Effect has a program that obtains the email addresses in Acting Context Record and the Action Form Record (or equivalently, the contact information of users) and sends an email message to each address. Accept/Reject: The pattern corresponds to two coordinated actions. Each action has a program that inserts the Acting Context Record into the database, with an additional attribute indicating whether the Acting Record is accepted or rejected. Choose: The Affected Records encompass the Acting Context Record. The Affected User is the Acting User. Invite: The Affected User is one or more users from the Acting Context Users. Share: The Affected Records encompass the Acting Context Record or the Action Form Record.

Figure 15A:
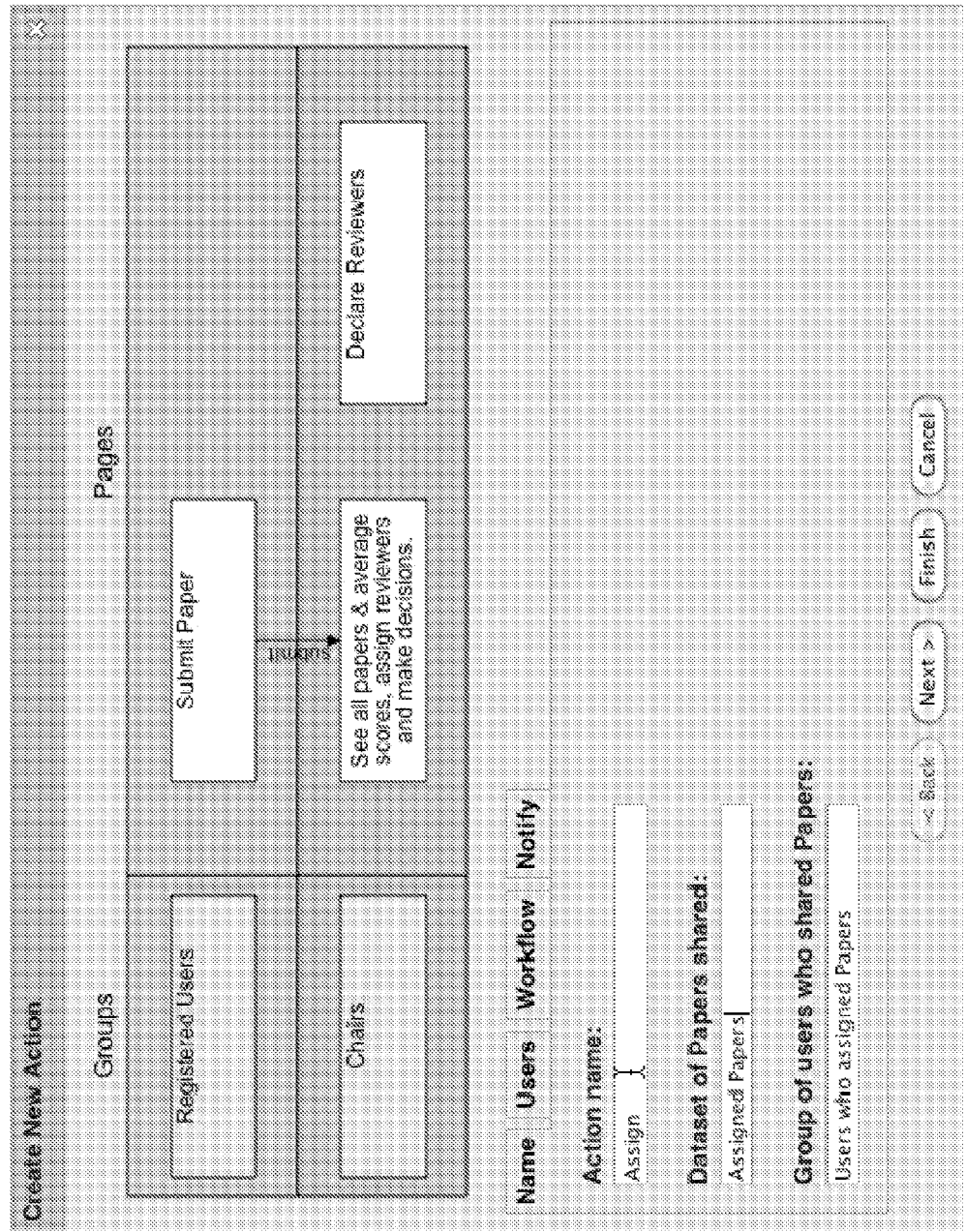
Figure 15B:
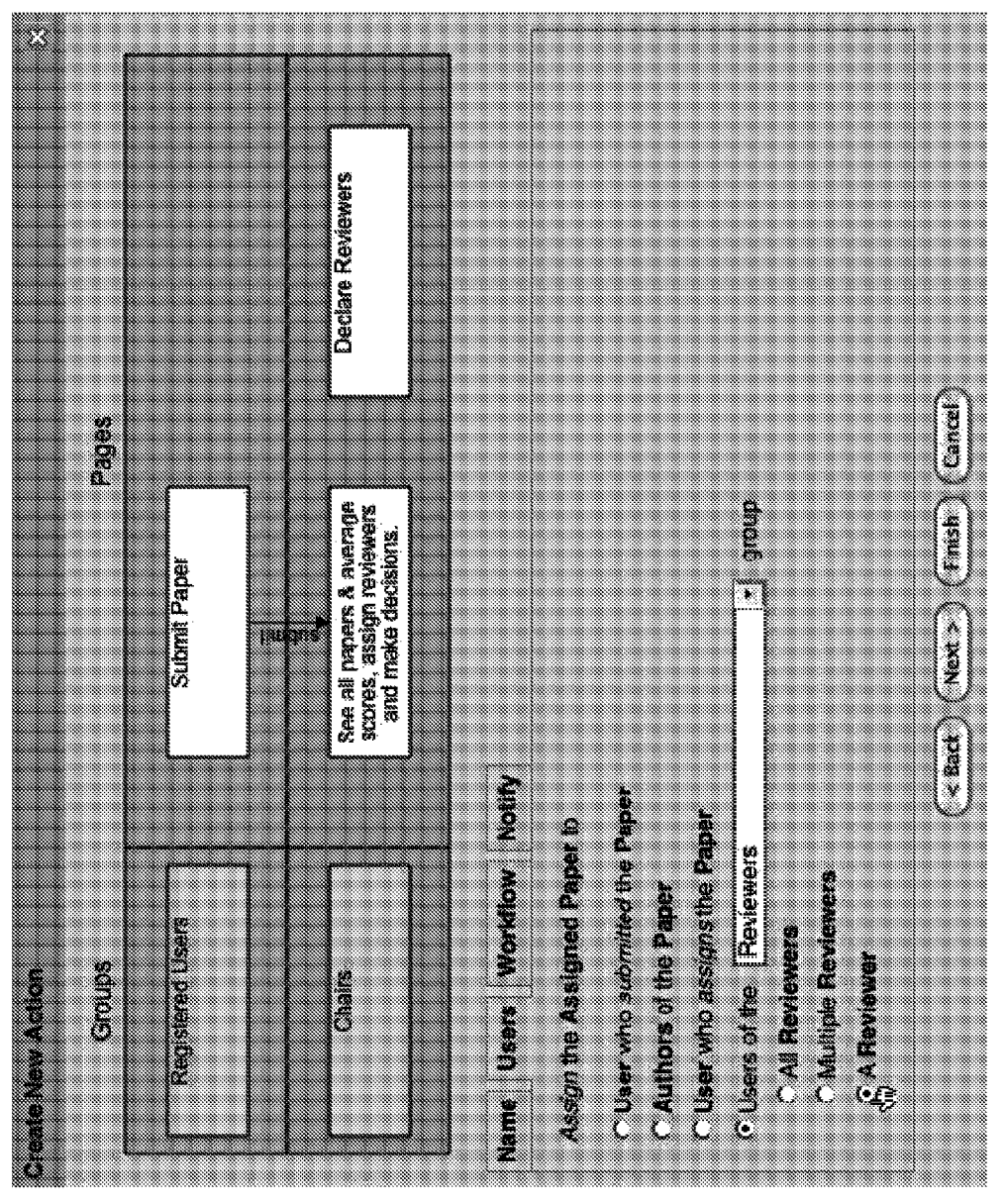
Figure 15C:
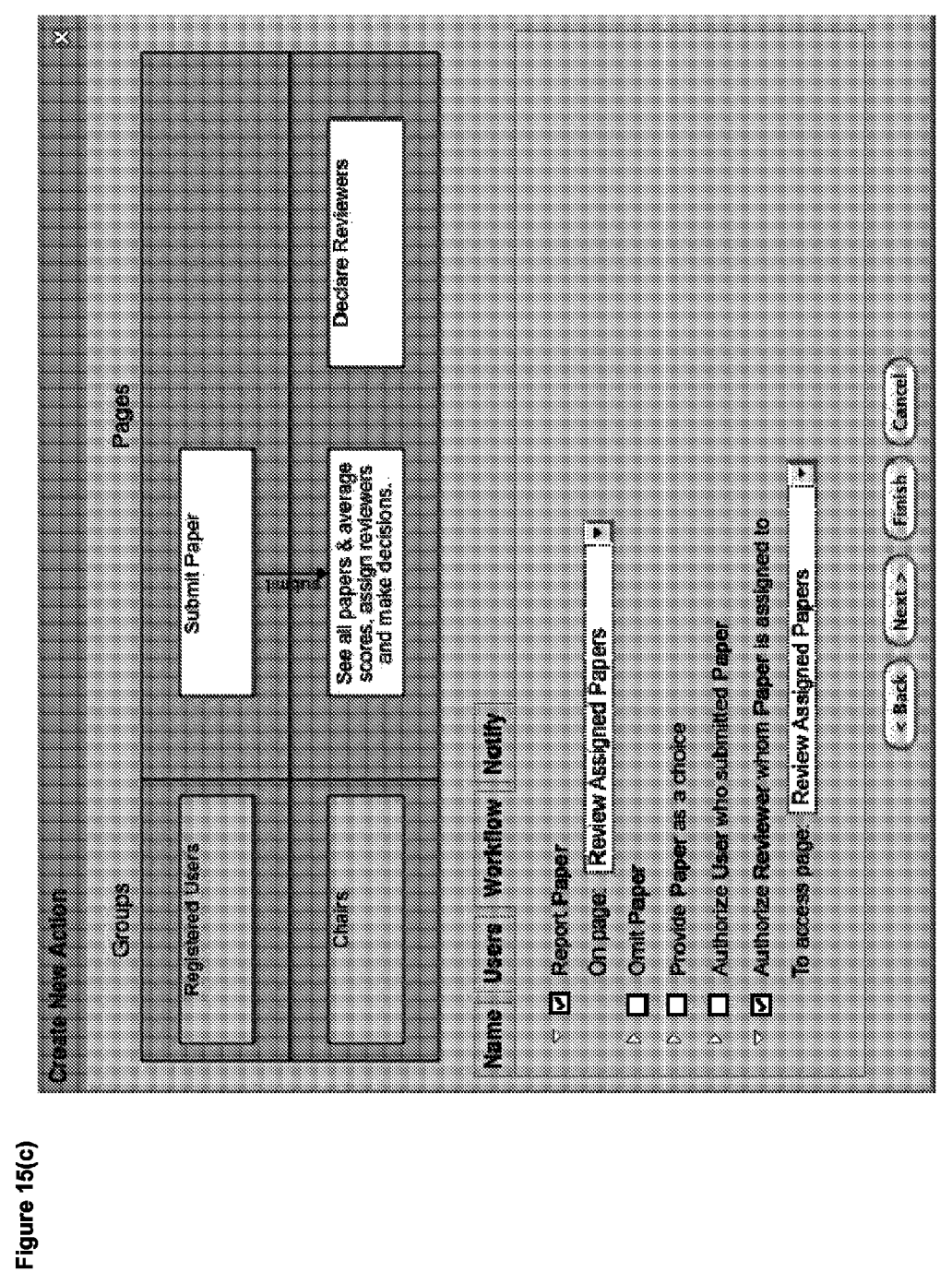
Figure 15D:
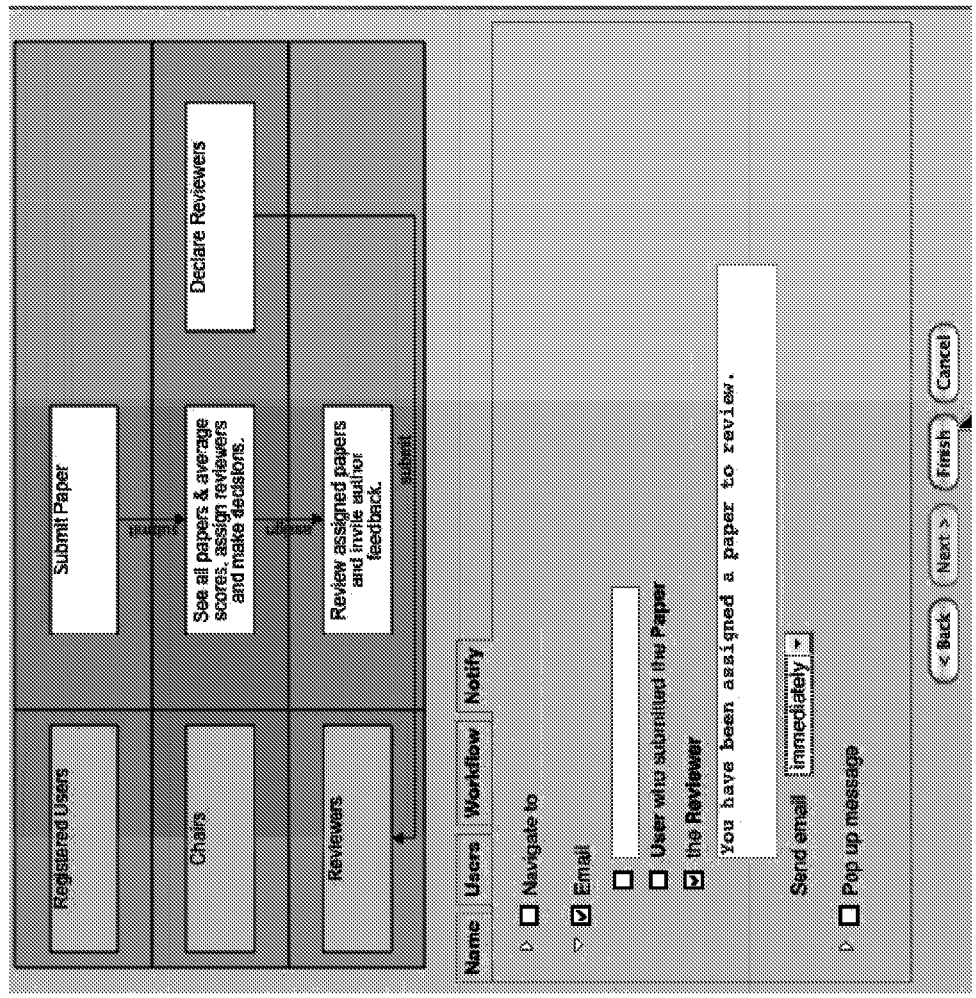

As an example, we will consider the workflow wizard for the Assign action in FIG. 15 and describe how the above properties are explained to the designer using its tabs, and how she customizes the request to assign papers to reviewers.

Name tab (FIG. 15*a*): The wizard asks for a name for the action 1311, and other semantic names such as the set of acting records (Assigned Papers), and the set of acting users (Users who assign Papers). Note that the wizard has assumed a default value for the acting user group 1312 to be all users who can access the page, and the acting context 1313 to be based on where the designer dropped the action on the page.

Users Tab (FIG. 15*b*): Here, the wizard is prompting for an affected rights specification 1317, specifically the affected users 1322, by asking the designer to decide which user group to assign Paper records to. Note that the wizard has already defaulted the affected records 1323 based on the context in which the designer dropped the action in the All Papers page. The designer chooses a single user of the Reviewers group and moves to the next tab.

WorkFlow Tab (FIG. 15*c*): The wizard is prompting for an affected rights specification 1317, specifically the different types of access rights that can be affected, and whether they are enabled/disabled 1324. The designer has to decide how she wants the action to affect the rights of the reviewers on Paper records. The option Report Paper grants read rights to the reviewers. Omit Paper revokes read rights, Provide Paper as a Choice allows the reviewers to reference Paper records in a form field. Authorize User and Authorize Reviewer options grant access rights to the corresponding group. Note that the designer can choose more than one option. For each one, the designer additionally specifies the target page, either an existing or a new one, on which the rights changes will be in effect.

Coming back to the running example, the designer chooses the options to Report Paper records to reviewers and Authorize Reviewers to access a new page named Review Assigned Papers. These choices will grant read access to the reviewers to whom papers have been assigned to, will create the Review Assigned Papers page, grant access rights to reviewers, and report assigned Paper records for the currently logged-in reviewer only.

Notify Tab: The wizard is prompting for the action effect 1316, specifically whether the designer chooses to notify the affected users once an action has been invoked. Navigate to the target page, send an email to the affected users, and popup a dialog are among the available options. In our example, the designer sets up automatic email notifications to each reviewer once a day.

Once the designer exits the wizard, the system invokes the application inference engine 1305, and automatically places an assign action in the context of each Paper, along with a drop-down box that references the reviewers. When a chair chooses a reviewer, the action invocation will result in the paper being assigned to the specific reviewer, thereby the application enforces the access rights as specified by the designer.

Figure 17:
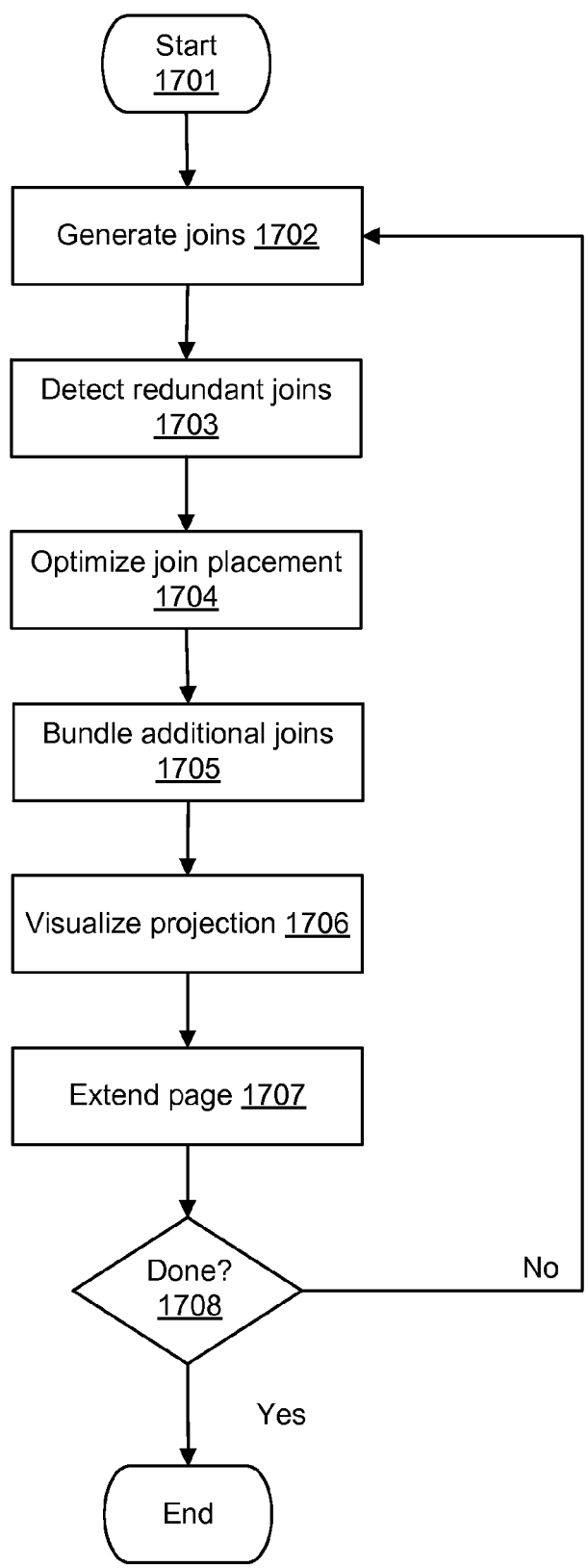
FIG. 17 is an example of a flow diagram of a process of prompting for specification of a complex report.

FIG. 17 shows an example of a flow diagram of a process of prompting for specification of a complex report. This flow diagram provides an overview of how the data combination engine prompts the designer to provide the specification of pages with complex reports. The data combination engine can leverage semantic information previously specified by the designer, in order to provide the designer a minimal interface for designing complex reports, while compensating for this minimalism with algorithms that automate implementation details. Consequently, the designer does not have to specify low-level implementation details of queries such as projections, join conditions and selection conditions.

In Step 1702, the engine generates the list of possible join paths. This is done by considering each pair-wise combination of iterators from the base page (i.e. the page to be extended) and iterators from other pages in the application, and enumerating possible join paths that represent relationships between the respective queries of the iterator pairs. Without limitation, in one embodiment, a join path is a left-deep relational join of the form:

$$FC(b) \ldots \bowtie_{c_n} FC(i_n) \bowtie_{c_{n+1}} \ldots FC(e)$$

where $FC(i)$ is the context of an iterator $i$, and the join conditions $c_n$ are conjunctions of equalities between attributes. Attribute join-pairs that qualify as join conditions include (1) between id attributes and corresponding foreign key attributes (2) between email attributes corresponding to user groups, and Submitted By/Edited By attributes of records accessible by said user groups.

In Step 1703, the engine detects join paths that are redundant, so that only useful join paths are presented to the designer. Without limitation, in one embodiment the data combination engine makes a hypothetical extension of the base iterator (i.e., the to-be-extended iterator of the base page), and uses view equivalency to test whether the extension adds only redundant information on the page. A join path is redundant if it leads to a new iterator x, where there is already an iterator y such that for all possible database instances that satisfy the schema and its constraints, each tuple $t_x=(v_1, \ldots, v_n)$ in FC(x) has a corresponding tuple $t_y$ in FC(y) that has $v_1, \ldots, v_n$ and vice versa.

In Step 1704, the engine optimizes the join placement of extension iterators. Given two generated join paths where the extension iterators are the same, one join path can be strictly better than the other if its placement visualizes more constraints than the other. Without limitation, in one embodiment, the engine runs a chase procedure to determine the functional dependencies in the schema that can be visualized with the appropriate placement and nesting of iterators.

In Step 1705, the engine uses the list of surviving extension iterators, and for each extension iterator bundles additional join paths that are semantically related to it.

The engine uses various criteria in order to decide whether two iterators should be bundled together. In effect, the decision of whether to bundle or not reduces to the question of whether it is meaningful according to the access rights to bundle the contexts of such iterators under a new iterator. In one embodiment, the engine decides as follows whether a candidate new iterator, with context C, should appear in page where it will be accessible by a user group G: If there is already a page P' that has an iterator with the same context C and P' (and therefore C) is accessible to users of G then the candidate new iterator is an appropriate one for P also.

For example, consider the page Paper Details of FIG. 18(*a*) that is accessible to the Chairs. When this page was created by the engine, the assignments were automatically bundled into it. The reason is that the (i) candidate iterator Assign has context including of joined paper and assignment records and (ii) there already is a page that is accessible by Chairs, namely the All Papers page of FIG. 20(*b*), that has an iterator, namely the Assign iterator, that has equivalent context, i.e., it shows joined paper and assignment records.

In contrast, if, say, the Paper Details was meant to be visible to the Authors, the engine would not add the assignments into it automatically, since no other page allows the Authors to read the assignments of a paper.

The above technique about how to automatically extend a page according to the access rights can carry over to actions. For example, the engine can decide that the "remove assignment" action of All Papers should also be included automatically in the Paper Details since the Chairs have the action right to remove an assignment in the page All Papers.

Note that such automatic additions can always be revoked subsequently by the designer.

In Step 1706, the engine prompts the designer to specify the visibility of the extension iterators' contents (i.e. projection list). Without limitation, in one embodiment the visibility of fields and iterators can be easily toggled with checkboxes.

In Step 1707, the engine prompts the designer whether a page should be extended according to the specifications given in Steps 1702-1706.

In Step 1708, the designer decides whether to invoke the engine again to increase the complexity of the page, or to end the design activity.

Figure 18A:
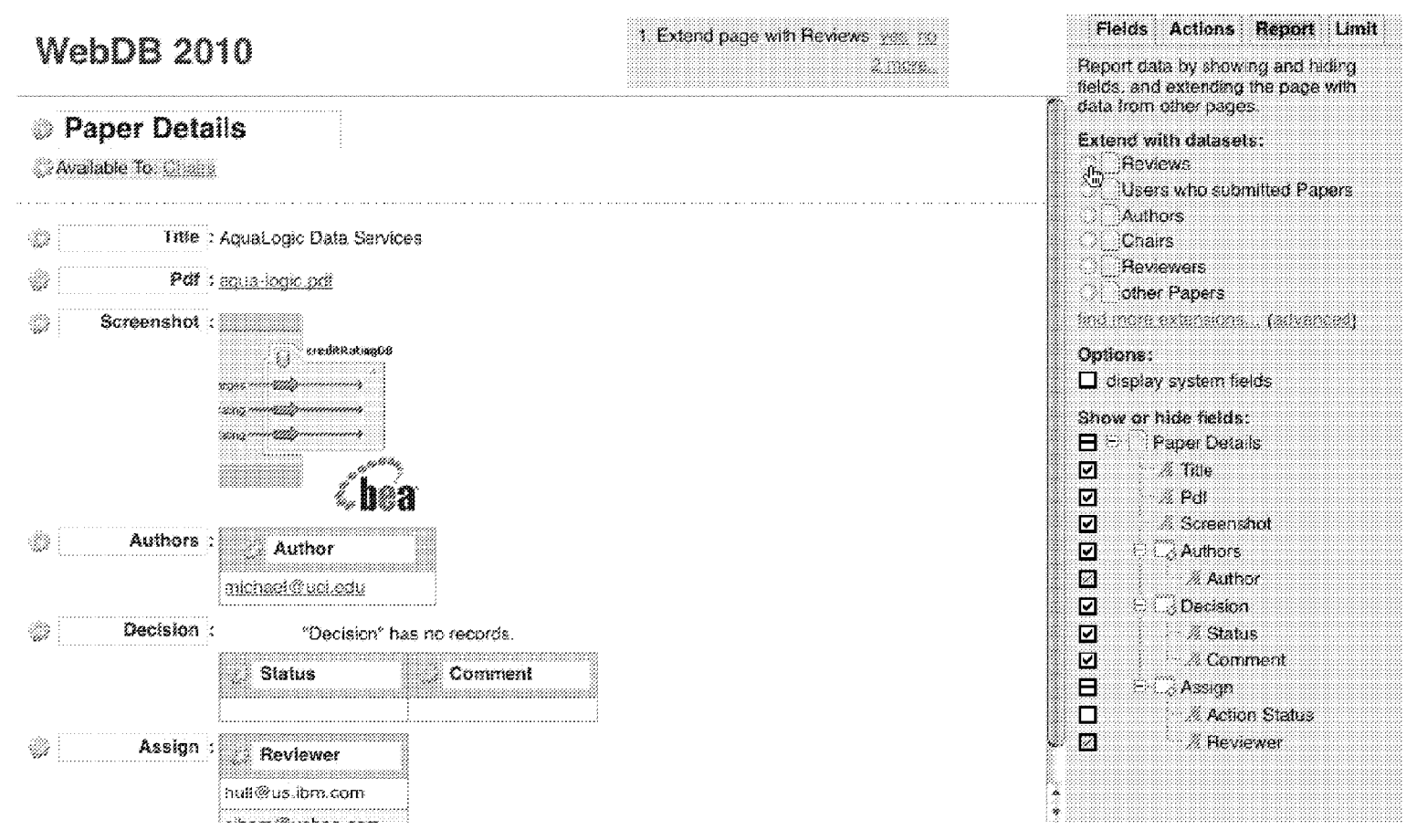
Figure 18B:
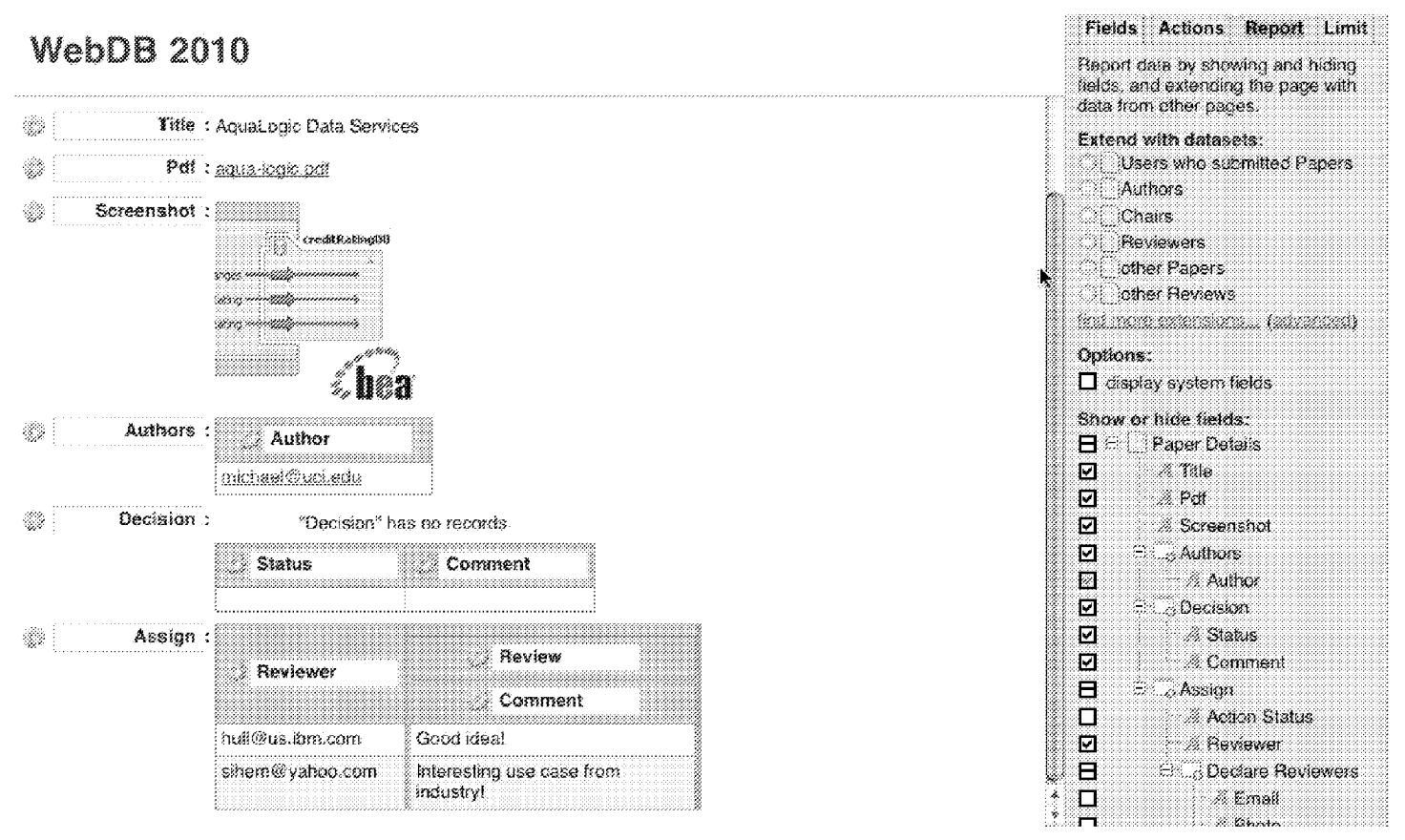

FIGS. 18(*a*) and 18(*b*) show screenshots of examples of using data combination engine. To observe the UI minimalism, we consider how the designer can extend the Paper Details page with the comments that advisors have submitted on Review Assigned Papers. Such an augmented Paper Details is shown in FIG. 18*b*.

FIG. 18*a* shows the WYSIWYG design of Paper Details, during which the designer selects the Report tab and sees options for extending the page. For example, the first option corresponds to extending Paper Details with data on Review Assigned Papers. The intuitive understanding is that selecting an option will cause the system to produce a more complex report, which is an amalgamation of both pages.

FIG. 18*b* shows that after the above-mentioned option is selected, the system has introduced reviews by extending the Assign iterator's unit with the Reviews iterator. Through the WYSIWYG interface (and appropriate sample data), the designer receives immediate visual feedback of the extension. She can then perform further customization, such as hiding extraneous fields and iterators, deleting the extension and starting over, or repeat the design activity of extending the page.

This minimal interface is intended to capture the common case of designing reports. Sophisticated designers may choose to obtain explanatory details for an option in order to customize join conditions.

To enable this high degree of ease for the designer, the system has employed various DIY features and heuristics. The technical challenge lies in intelligently restraining the infinite space of all possible joins, to produce a summarized enumeration of options for the common case.

When the designer selects the Report tab, the system produces the list of options by first generating a (finite) list of join paths. This is the core mechanism by which ultimately the designer chooses from enumerated options, rather than specify join conditions using arbitrarily complex Boolean conditions.

For each pair comprising an iterator b of the base page, (that is, the report page to be extended—Paper Details in the example) and an iterator or a request e of any extension page, the system attempts to find join paths that connects b and e. A join path is a left-deep relational join of the form:

$$FC(b) \ldots \bowtie_{C_n} FC(i_n) \bowtie_{C_{n+1}} \ldots FC(e)$$

where FC(i) is the flat context of an iterator i.

Some example join paths between base iterators on the Paper Details page and extension iterators on the Review Assigned Papers page are the following. For the sake of example, assume the Review Assigned Papers page also shows the Authors iterator.

| | |
|---|---|
| a. | FC(Paper_Details) |
| | $\bowtie$[lhs.paper_id = rhs.paper_ref] |
| | FC(Founders) |
| b. | FC(Paper_Details) |
| | $\bowtie$[lhs.paper_id = rhs.paper_ref] |
| | FC(Review_Assigned_Papers) |
| c. | FC(Assign) |
| | $\bowtie$[lhs.paper_id = rhs.paper_ref AND lhs.reviewer = rhs.submitted_by] |
| | FC(Review_Assigned_Papers) |

The flat context of an iterator i is its corresponding non-parameterized query. If i is the top-level iterator of the page, then FC(i) is simply the query producing the records displayed in i. If i is nested within iterator h, then FC(i) is FC(h) appropriately joined with the query producing the records displayed in i.

The join conditions $c_n$ are conjunctions of equalities between attributes. Currently, the system considers two types of attribute join-pairs: (1) between id attributes, and corresponding foreign key attributes (2) between email attributes corresponding to user groups, and Submitted By/Edited By attributes of records accessible by said user groups. This reflects the common intuition where the majority of join conditions involve unique identifiers, be they surrogate keys generated by the database or natural keys such as email addresses.

Note that the generated join paths do not contain cycles (i.e. an iterator can only occur once in the path), otherwise there can be an infinite number of paths. The exception is that b and e can be the same iterator, so that the designer can make arbitrary self-joins by choosing the same e for subsequent extension rounds.

The list of join paths generated is finite, but not all join paths are useful enough to present as options to the designer. For each join path, the system makes a hypothetical extension of the base iterator, and uses view equivalency to test whether the extension adds only redundant information on the page.

For example, join path (a) is provably redundant and can be discarded, since there is already an Authors iterator on the base page Paper Details.

A conservative definition of redundancy is the following: A join path is redundant if it leads to a new iterator x, where there is already an iterator y such that for all possible database instances that satisfy the schema and its constraints, each tuple $t_x=(v_1, \ldots, v_n)$ in FC(x) has a corresponding tuple $t_y$ in FC(y) that has $v_1, \ldots, v_n$ and vice versa.

Note that such a definition does not prevent self-joins or, more generally, reports where a database table occurs multiple times as a result of different join conditions. The redundancy test is accomplished by essentially reducing all constraints into embedded dependencies, asserting the existence of $t_x$ in FC(x) and running a chase procedure that deduces tuples that must exist in the flat contexts of other iterators on the page.

Given two generated join paths where the extension iterators are the same, one join path may be strictly better than the other. For example, contrast join path (b) with (c). Extending Paper Details with (b) will place reviews on each startup, whereas (c) will place reviewer reviews on each reviewer assignment. Intuitively, (c) is preferable to (b), as only the former visualizes the existing association between a reviewer assignment to a specific reviewer, and the corresponding review.

This intuition can be expressed as functional dependencies between records. A paper can be assigned at most once to each reviewer, and a reviewer can submit at most one review for each paper. Therefore, a review functionally determines an assignment, which in turn functionally determines a paper. Since the system relies heavily on WYSIWYG visualization to assist the designer in making design choices, it is important that wherever possible, functional dependencies and other constraints in the schema be visualized with the appropriate placement and nesting of iterators. Extending with (c) will produce a more accurate visualization of the functional dependencies.

In some implementations, running a chase procedure can have the side benefit of also producing the necessary functional dependencies.

After discarding pruned join paths, the surviving ones are aggregated by the pages of the extension iterators, and presented as a list of options as in FIG. 18a. This achieves the minimal interface with a corresponding high-level of specification, as the designer only needs to comprehend pages (and not join paths) to start creating complex reports.

Note that the system uses the page rather than the iterator as the level of summarization. This comes from the observation that due to the parameterization between nested iterators, the standalone functionality of an iterator is harder to perceive than that of a page. Moreover, the existence of a report page is a strong hint that its structural organization is useful. Therefore, bringing in the entirety of the page en masse as part of the extension and allowing the designer to later hide extraneous fields and iterators provides better visual cues, than allowing the designer to extend one iterator at a time.

For an example, consider an alternate scenario where startups can provide rebuttals to reviews. There will be a page Rebut Reviews, that reports reviews and annotates them with a Rebuttal iterator. If Paper Details were not extended with Review Assigned Papers, but were instead extended with Rebut Reviews the bundling of additional joins will introduce both reviews and rebuttals with a single round of extension.

Iterators and fields can be easily shown and hidden with checkboxes (FIG. 18b). For example, each iterator has a few hidden-by-default system fields, such as Submit Timestamp. The designer can easily customize the new Reviews iterator to display when each advisor submitted her comment. From the DIY perspective, it is far preferable for the designer to toggle visibility of iterators and fields through an enumerated list, than to manually specify a projection list of attributes (a la query languages such as SQL).

Figure 20C:

FIGS. 20(a), 20(b), and 20(c) show examples of different pages of an application. An example of an application for an academic conference with peer-reviewed papers is described herein. Using the application, authors will submit papers, which the chairs will subsequently assign to designated reviewers. After reviewers have provided their reviews, the chairs will then decide which are the papers selected for the conference.

In FIG. 20a, at page Submit Paper any user with a registered account can prepare and submit a paper, which includes information such as the title, a PDF file, and list of authors. In the example application, users must first pass from a typical login and signup page before they reach the page of FIG. 20a. Every user is constrained to at most one paper submission.

In FIG. 20b, the submitted papers are displayed on the All Papers page, which is accessible by all chairs, each of whom can execute two actions on each paper: (1) assign the paper to one or more reviewers, in which case the paper will be displayed to the specified reviewers; (2) submit a decision about whether the paper is selected for the conference.

In FIG. 20c, the Review Assigned Papers page will display only the papers that have been assigned to a particular reviewer. Each reviewer can submit at most one review for each paper, and reviewers cannot view each other's reviews.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for designing web applications, comprising:
providing a design interface for receiving information specifying user actions for creating an application with different user groups and access rights, the design interface operable to specify an action to include to a page of the application, wherein the action, when invoked during execution of the application, modifies the application state;
receiving in the design interface an action specification, which specifies that the action invoked by a user during execution of the application will cause a modification of one or more access rights of one or more affected users, wherein the one or more access rights include an access right for accessing pages in the application, an access right for accessing records in the application and an access right for executing actions in the application; and
using the design interface to generate the application that implements the action specification;
wherein providing the design interface to create the application comprises:
providing an enumeration of a group of action patterns; and
receiving an input that specifies at least one of the actions using an action pattern from the group of action patterns, wherein the action pattern provides default values for the action specification.

2. The method of claim 1, wherein the action specification specifies that the affected users of the access rights modification include at least one of the following: the user that invokes the action, one or more users appearing in the context of the action, one or more users appearing in action forms of the action, or one or more users identified based on a query parameterized by zero or more of the preceding users.

3. The method of claim 1, wherein the action specification specifies that the affected records of the access rights modification include at least one of the following: a record encompassing the acting user, an acting context record, an acting form record, or one or more records identified based on a query parameterized by zero or more of the preceding records.

4. The method of claim 1, wherein the action specification includes an access right condition query that is either not parameterized, or parameterized by at least one of: the acting user, acting context record, and acting form record.

5. The method of claim 1, wherein using the design interface to generate the application to implement the action specification involves: determining whether the action specification is applicable to one or more actions of the application that belong to iterator contexts having identical logical contexts, wherein the logical contexts comprise a grouping of equivalent iterator contexts.

6. A system for designing and hosting web applications, comprising:
a server machine for designing and hosting web applications and including one or more processors and memories that are configured to include:
a mechanism configured to provide a design interface for receiving information specifying user actions for creating an application with different user groups and access rights including an access right for accessing pages in the application, an access right for accessing records in the application and an access right for executing actions in the application, the design interface operable to specify an action to include to a page of the application, wherein the action, when invoked during execution of the application, modifies the application state;
a mechanism configured to provide a user interface that interfaces with one or more users in the different user groups to receive user requests for using and accessing the application based on particular access rights granted to the user;
a mechanism configured to provide a data manager in communication with the design interface and the user interface and configured to communicate and manage data in connection with the application state of the application during designing of the application and during accessing of the application;
a mechanism configured to receive in the design interface an action specification, which specifies that the action invoked by a user via the user interface during application execution must result in the modification of one or more access rights of one or more affected users; and
a mechanism configured to provide an application inference engine, which generates an application that implements the action specification;
wherein the mechanism configured to provide the design interface is configured to provide an enumeration of a group of action patterns; and receive an input that specifies at least one of the actions using an action pattern from the group of action patterns, wherein the action pattern provides default values for the action specification.

7. The system of claim 6, wherein the action specification specifies that the affected users of the access rights modification include one of the following: the user that invokes the action, one or more users appearing in the context of the action, one or more users appearing in the forms associated with the action, or one or more users identified based on a query parameterized by zero or more of the preceding users.

8. The system of claim 6, wherein the action specification specifies that the affected records of the access rights modification include one of the following: a record encompassing the acting user, an acting context record, an acting form record, or one or more records identified based on a query parameterized by zero or more of the preceding records.

9. The system of claim 6, wherein the action specification includes an access right condition query that is either not parameterized, or parameterized by at least one of: the acting user, acting context record, and acting form record.

10. The system of claim 6, wherein the mechanism configured to generate the application to implement the action specification is configured to determine whether the action specification is applicable to one or more actions of the application that belong to iterator contexts having identical logical contexts, wherein the logical contexts comprise a grouping of equivalent iterator contexts.

11. The system of claim 6, wherein the application inference engine is configured to infer queries and commands in the application to implement access rights based on the modification of the one or more access rights.

12. The system of claim 6, wherein the one or more processors and memories are configured to include a page inference engine which is configured to infer pages and relate pages to data structures in an application database managed by the data manager.

13. The system of claim 12, wherein the one or more processors and memories are configured to include a schema inference engine which is configured to infer data structures in the application database.

* * * * *

UNITED STATES PATENT AND TRADEMARK OFFICE
CERTIFICATE OF CORRECTION

| | | |
|---|---|---|
| PATENT NO. | : 8,898,623 B2 | Page 1 of 1 |
| APPLICATION NO. | : 12/650539 | |
| DATED | : November 25, 2014 | |
| INVENTOR(S) | : Keliang Zhao et al. | |

It is certified that error appears in the above-identified patent and that said Letters Patent is hereby corrected as shown below:

In the Specification

In Column 1, Line 15, delete "the this" and insert -- this --, therefor.

In Column 6, Line 65, delete "100, 102" and insert -- 101, 103 --, therefor.

In Column 8, Line 5, delete "machine. examples" and insert -- machine, examples --, therefor.

In Column 9, Line 50, delete "$t_1...t_n$," and insert -- $t_1...t_n$ --, therefor.

In Column 10, Line 54, delete ""SELECT" and insert -- "SELECT* --, therefor.

In Column 10, Line 63, delete "payment" and insert -- payment. --, therefor.

In Column 11, Line 16, delete "e.g:" and insert -- e.g. --, therefor.

In Column 16, Line 20, delete "engine 132," and insert -- engine 134, --, therefor.

In Column 19, Line 8, delete "a assigned" and insert -- an assigned --, therefor.

In Column 23, Lines 51-52, delete "(Assign_re-F column). The Assign_re-F" and insert -- (Assign_ref column). The Assign_ref --, therefor.

In Column 23, Line 54, delete "an reviewer" and insert -- a reviewer --, therefor.

In Column 26, Line 53, delete "paper_re-F" and insert -- paper_ref --, therefor.

Signed and Sealed this
Twenty-third Day of June, 2015

Michelle K. Lee
*Director of the United States Patent and Trademark Office*